United States Patent
Goldstein et al.

(10) Patent No.: US 9,922,131 B2
(45) Date of Patent: Mar. 20, 2018

(54) GRAPHICAL USER INTERFACE MACHINE TO PRESENT A WINDOW

(71) Applicant: Hipmunk, Inc., San Francisco, CA (US)

(72) Inventors: Adam Julian Goldstein, San Francisco, CA (US); Steven Ladd Huffman, San Francisco, CA (US); Seth Satoshi Sakamoto, San Carlos, CA (US); Ryan James Schwers, San Francisco, CA (US); Christopher Brian Slowe, San Francisco, CA (US); Niranjan Ramadas, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 159 days.

(21) Appl. No.: 14/528,395

(22) Filed: Oct. 30, 2014

(65) Prior Publication Data

US 2015/0128023 A1    May 7, 2015

Related U.S. Application Data

(60) Provisional application No. 61/900,630, filed on Nov. 6, 2013.

(51) Int. Cl.
*G06F 17/00* (2006.01)
*G06F 17/30* (2006.01)

(52) U.S. Cl.
CPC .............. *G06F 17/30899* (2013.01)

(58) Field of Classification Search
CPC ................................. G06F 17/30899
USPC ......................................... 715/234
See application file for complete search history.

(56) References Cited

U.S. PATENT DOCUMENTS

| | | | | |
|---|---|---|---|---|
| 7,685,515 | B2* | 3/2010 | Braud | G06Q 10/06 715/234 |
| 8,631,415 | B1* | 1/2014 | Nadathur | G06F 9/5088 712/10 |
| 8,667,417 | B1* | 3/2014 | Goodger | G06F 17/30899 715/808 |
| 2003/0033382 | A1* | 2/2003 | Bogolea | G06Q 30/02 709/218 |
| 2004/0001102 | A1* | 1/2004 | Blaschke | G09G 5/14 715/789 |
| 2004/0122808 | A1* | 6/2004 | Martin | G06F 17/30899 |

(Continued)

*Primary Examiner* — Howard Cortes
(74) *Attorney, Agent, or Firm* — Schwegman Lundberg & Woessner, P.A

(57) ABSTRACT

Within a graphical user interface, a window may be spawned at one point in time and then populated with content at a later point in time. By execution of browser-executable code by a user's device and corresponding server-side code by a machine, a pop-under window may be spawned by the user's device. The spawned pop-under window may be initially hidden by the user's browser window and may be initially loaded with no content or default content. The device may monitor the graphical user interface for search criteria submitted by the user and update the spawned pop-under window based on such search criteria. If the user exits the webpage, and if rules allow presentation of a pop-under window, the pop-under window may be updated by the device for presentation to the user. Based on interest or lack of interest in the updated content, the user may revisit the website.

20 Claims, 13 Drawing Sheets

(56) References Cited

U.S. PATENT DOCUMENTS

| | | | |
|---|---|---|---|
| 2005/0267981 A1* | 12/2005 | Brumley | H04L 67/02 709/232 |
| 2006/0064410 A1* | 3/2006 | Razza | G06F 17/3089 |
| 2007/0107057 A1* | 5/2007 | Chander | G06F 21/54 726/22 |
| 2010/0146383 A1* | 6/2010 | Kim | G06F 17/30905 715/238 |
| 2012/0016752 A1* | 1/2012 | Crim | G06Q 30/0277 705/14.73 |
| 2012/0090026 A1* | 4/2012 | Andrews | G06F 17/3089 726/22 |
| 2014/0068421 A1* | 3/2014 | Bourke | G06F 8/38 715/235 |
| 2014/0297743 A1* | 10/2014 | Zyto | H04L 67/10 709/204 |

* cited by examiner

GRAPHICAL USER INTERFACE MACHINE TO PRESENT A WINDOW

TECHNICAL FIELD

The subject matter disclosed herein generally relates to machines that are configured to process data. Specifically, the present disclosure addresses systems and methods to facilitate presenting a window within a graphical user interface.

BACKGROUND

A user may operate a machine, such as a user device, to request, receive, and present content (e.g., web content). For example, a user device may execute a browser application that, according to input from the user, requests a document (e.g., a webpage) from another machine, such as a server (e.g., webserver), which may respond by communicating the document to the user device. The user device may then present some or all of the document (e.g., some or all of the document's contents) within a window (e.g., graphical user interface window) on a display screen of the user device.

BRIEF DESCRIPTION OF THE DRAWINGS

Some embodiments are illustrated by way of example and not limitation in the figures of the accompanying drawings.

DETAILED DESCRIPTION

Figure 1:
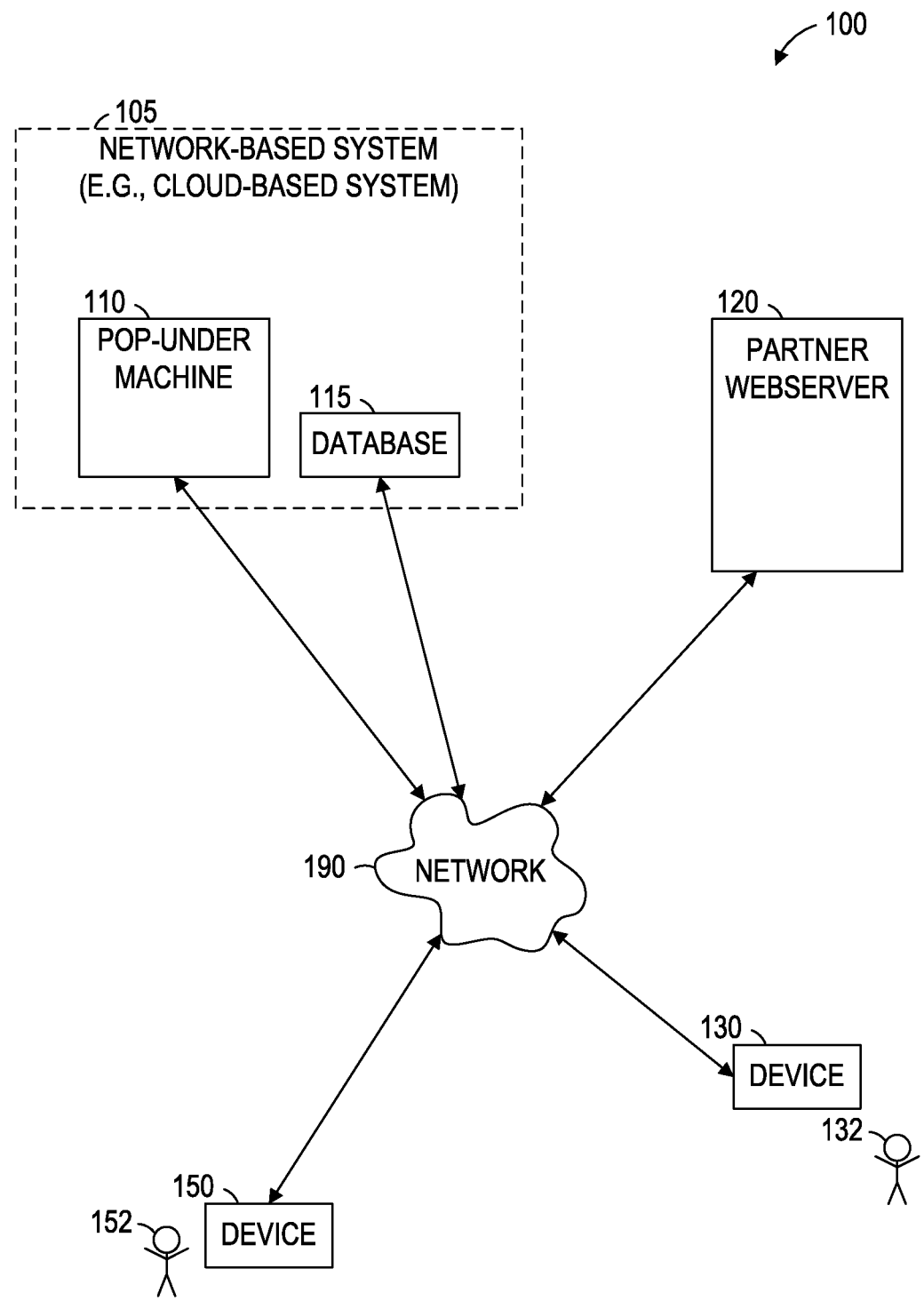
FIG. 1 is a network diagram illustrating a network environment suitable for operating a pop-under machine configured to present a pop-under window, according to some example embodiments.

Example methods and systems are directed to presentation of a window (e.g., a pop-up window or a pop-under window) within a graphical user interface generated by a machine (e.g., a graphical user interface machine). The window may be spawned at one point in time (e.g., in response to a user navigating to a website via a browser) and then populated with content at a later point in time (e.g., in response to the user exiting the website presented in the browser) for viewing. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a graphical user interface machine configured in the specialized form of a pop-under window machine or a pop-over window machine) may be operated in partnership with one or more webserver machines that serve their own respective websites (e.g., sets of webpages served from corresponding network domains) with their own respective search engines. For example, a graphical user interface machine may be operated by a multi-airline travel search website (e.g., Hipmunk.com) in partnership with an airline named Super Airlines, which may operate an airline website (e.g., SuperAirlines.com) configured to let users search for flights available from Super Airlines. In such a case, a user may cause a browser that is executing on his device to request and present one or more webpages from the airline website. Such webpages may allow the user to enter search criteria (e.g., departure location, departure date, arrival location, and arrival date) and view search results (e.g., flight numbers, prices, and departure and arrival times). For clarity, example embodiments discussed herein focus on a travel search website operated in partnership with an airline website that allows users to search for flights, though the methodologies discussed herein are similarly applicable to partnerships with other websites that allow users to search for various other things, such as, hotels, cruises, rental cars, vacation packages, vacation rentals, train tickets, bus tickets, event tickets (e.g., sports, movies, concerts, or theater), or any suitable combination thereof.

According to a partnership agreement between the travel search website and the airline website, the airline website may provide the user's device with browser-executable code (e.g., one or more browser-executable scripts) that spawns (e.g., launches or creates) a pop-up window or a pop-under window in response to the user exiting the airline website (e.g., by closing his browser or visiting an unrelated website). The spawning of the pop-up or pop-under window may be controlled by one or more rules, which may be spawning rules, window rules, or business rules (e.g., previously agreed-upon between the travel search website and airline website). Such rules may be included in (e.g., coded into) the browser-executable code. However, many browsers may be configured (e.g., by their respective users) to disallow the spawning of pop-up windows, pop-under windows, or both, upon exiting a website.

The one or more rules may specify (e.g., define or indicate) conditions for spawning a pop-up window, a pop-under window, or both. As an example, a rule may specify a frequency cap, such that a user will not be shown more than a maximum number of pop-up windows or pop-under windows (e.g., within a session, or within a period of time, such as a day). As another example, a rule may specify that pop-up windows or pop-under windows be shown only to users that are logged in (e.g., to the airline website, to the travel search engine website, or both) or only to users who are not logged in. As a further example, a rule may specify that pop-up windows or pop-under windows be shown to certain users based on their locations (e.g., only users at airports that are airline spokes or airline hubs, or only users in certain cities). As yet another example, a rule may specify that pop-up windows or pop-under windows be shown only to users whose previously submitted search criteria included certain classes of service (e.g., first class or economy class). As yet a further example, a rule may specify that pop-up windows or pop-under windows be shown when a search is performed on certain days of the week, or when search criteria included certain days of the week. As a still further example, a rule may specify that pop-up windows or pop-under windows be shown during certain periods of time during which a special deal on selected travel options (e.g., advance purchase of flights, hotel stays, or both) is available.

Hence, the graphical user interface machine operated by the travel search website may be configured to generate (e.g., compile, validate, or both) and provide some or all of the browser-executable code (e.g., one or more scripts) discussed herein to the airline's webserver machine. This browser-executable code may be provided by the airline's webserver machine to the user's device within a webpage, and the user's device may execute this browser-executable code. The graphical user interface machine may additionally store and execute some corresponding server-side code (e.g., one or more scripts) itself, as discussed herein. Accordingly, by execution of the browser-executable code (e.g., by the user's device) and the corresponding server-side code (e.g., by the graphical user interface machine), a pop-under window may be spawned by the user's device prior to the user's exit from the airline website. For example, the pop-under window may be spawned in response to a click (e.g., one of the very first clicks) performed by the user somewhere on the webpage of the airline website. For clarity, the example embodiments discussed below describe methodologies in reference to a pop-under window, though these methodologies are similarly applicable to pop-up windows (e.g., pop-over windows).

As used herein, a "pop-under window" (also called a "pop-under") is a browser window that is separate from the user's current browser window and at least partially obscured by the current browser window when the pop-under window is initially spawned (e.g., opened or launched), giving the visual appearance that the pop-under window was spawned underneath or behind the current browser window, from the user's perspective. In situations where the pop-under window is spawned fully obscured by the current browser window, the pop-under window may be invisible to the user until the current browser window is closed. In contrast, a "pop-up window" (also called a "pop-up") is a browser window that is separate from the user's current browser window and obscures at least part of the current browser window when the pop-up window is initially spawned, giving the visual appearance that the pop-up window was spawned on top of, or in front of, the current browser window, from the user's perspective. Thus, in various situations, a pop-under window only becomes visible when the current browser window is closed, whereas a pop-up window is visible immediately upon spawning. From a technical standpoint, the pop-under window may be created—hidden from view by the current browser window—prior to the user closing the current browser window, so that the closing of the current browser window exposes the pop-under window to the user. This may have the effect of avoiding one or more features of modern browsers that prevent pop-up windows and pop-under windows from being created when the current browser window is closed.

A spawned pop-under window may be initially hidden from the user by the user's browser window and may be initially loaded with no content or else default content (e.g., content loaded or generated without influence from any search criteria submitted by the user to the airline website). Furthermore, browser-executable code may cause the device to monitor the browser for search criteria (e.g., query parameters) entered by the user and update the spawned pop-under window based on entered search criteria. If the user exits the webpage (e.g., exits the airline website by exiting the webpage), and if the applicable rules allow presentation of a pop-under window, the pop-under window may be updated by the device so that the updated pop-under window is presented to the user (e.g., visible after closure of the browser window that previously obscured the pop-under window, or visible due to popping the pop-under window in front of the browser window).

For example, in response to the user submitting search criteria, the device may extract search criteria from the webpage, and in response to the user exiting the webpage, the device may submit the search criteria to the travel search website, receive search results from the travel search website, and present one or more of the received search results in the spawned pop-under window. This may have the effect of recapturing some of the user's expressed interest in the search criteria previously submitted to the website. In addition, if the user is uninterested in any of the search results in the pop-under window, the user may choose to revisit the website (e.g., the airline website). In either situation (e.g., interest or lack of interest in the search results displayed in the pop-under window), the user's business may be recaptured by the operator of the website (e.g., the airline).

In some example embodiments, even if the rules allow for presentation of a pop-under window, the operator of the airline's webserver may invoke a killswitch script (e.g., previously provided by the travel search website). In such example embodiments, inclusion of the killswitch script within a webpage nullifies all or part of the browser-executable code. This may have the effect of enabling the operator of the airline website to configure the airline's webserver to include the browser-executable code into one or more of its webpages, but not need to undo this work to temporarily or permanently disable the browser-executable code on one or more webpages hosted by the airline's webserver (e.g., on some webpages but not on other webpages).

FIG. 1 is a network diagram illustrating a network environment 100 suitable for presenting a pop-under window, according to some example embodiments. The network environment 100 includes a pop-under machine 110, a database 115, a partner webserver 120, and devices 130 and 150, all communicatively coupled to each other via a network 190. The pop-under machine 110, with or without the database 115, may form all or part of a network-based system 105 (e.g., a cloud-based server system of one or more machines configured to provide one or more services to the devices 130 and 150), which may be configured to generate, provide, or execute one or more of the modules described herein. The pop-under machine 110, the partner webserver 120, and the devices 130 and 150 may each be implemented in a computer system, in whole or in part, as described below with respect to FIG. 13.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the pop-under machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
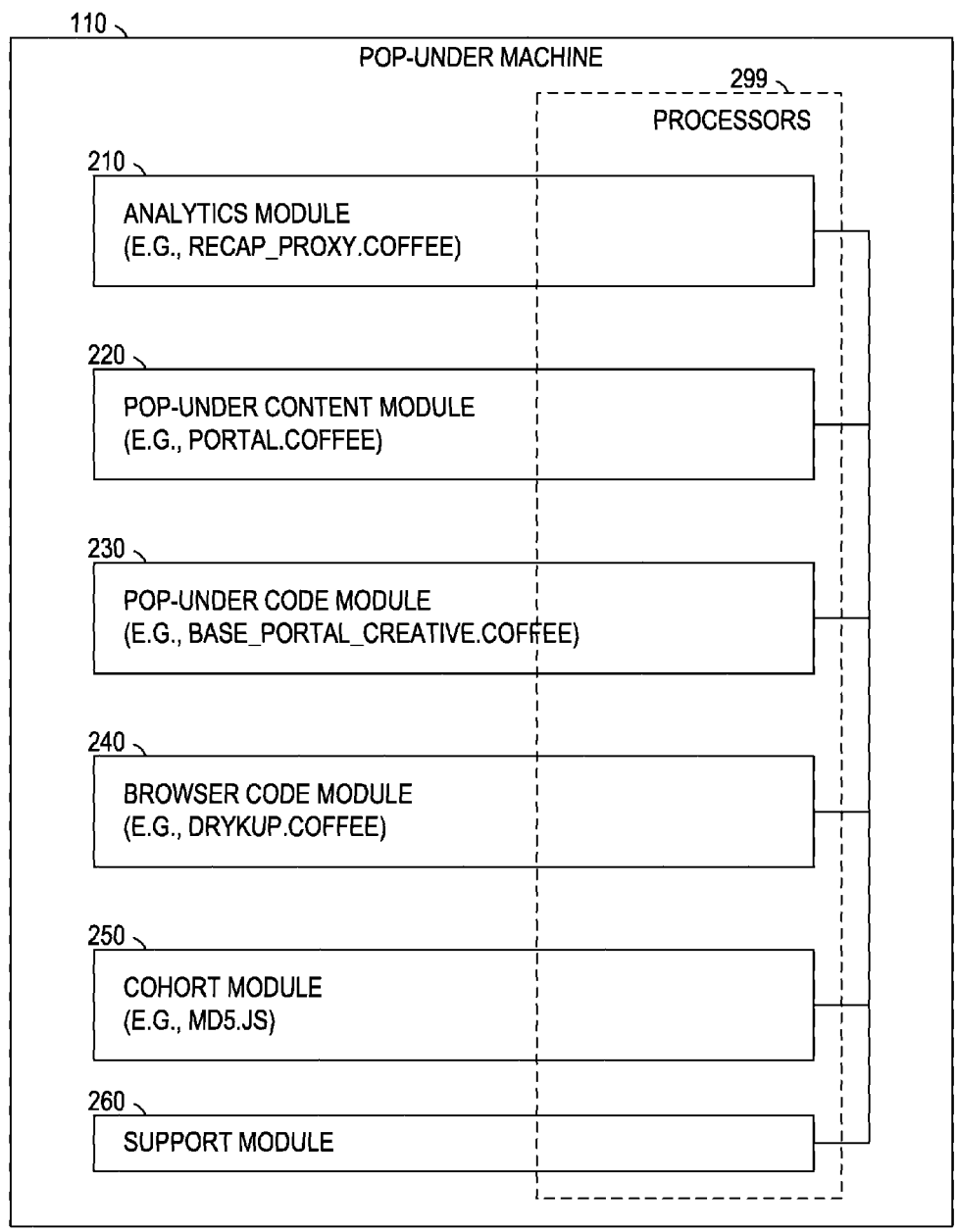
FIG. 2 is a block diagram illustrating components of the pop-under machine, according to some example embodiments.

FIG. 2 is a block diagram illustrating components (e.g., modules) of the pop-under machine 110 (e.g., operated by a travel search website), according to some example embodiments. The pop-under machine 110 is shown as including an analytics module 210 (e.g., recap_proxy.coffee, described below), a pop-under content module 220 (e.g., portal.coffee, described below), a pop-under code module 230 (base_portal_creative.coffee, described below), a browser code module 240 (e.g., drykup.coffee, described below), a cohort module 250 (e.g., md5.js, described below), and a support module 260 (e.g., a browser-executable code generation module), all configured to communicate with each other (e.g., via a bus, shared memory, or a switch). One or more of the analytics module 210, the pop-under content module 220, the pop-under code module 230, the browser code module 240, the cohort module 250, and the support module 260 may be generated (e.g., compiled), stored, and executed by the pop-under machine 110. The components of the pop-under machine 110 (e.g., in various operations with the partner webserver 120) are discussed in more detail below with respect to FIG. 3.

Any one or more of the modules described herein may be implemented using hardware alone (e.g., one or more processors 299 of a machine) or a combination of hardware and software. For example, any module described herein may physically include an arrangement of one or more processors 299 (e.g., a subset of or among the one or more processors of the machine) configured to perform the operations described herein for that module. As another example, any module described herein may include software, hardware, or both, that configure an arrangement of one or more processors 299 (e.g., among the one or more processors of the machine) to perform the operations described herein for that module. Accordingly, different modules described herein may include and configure different arrangements of such processors 299 or a single arrangement of such processors 299 at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
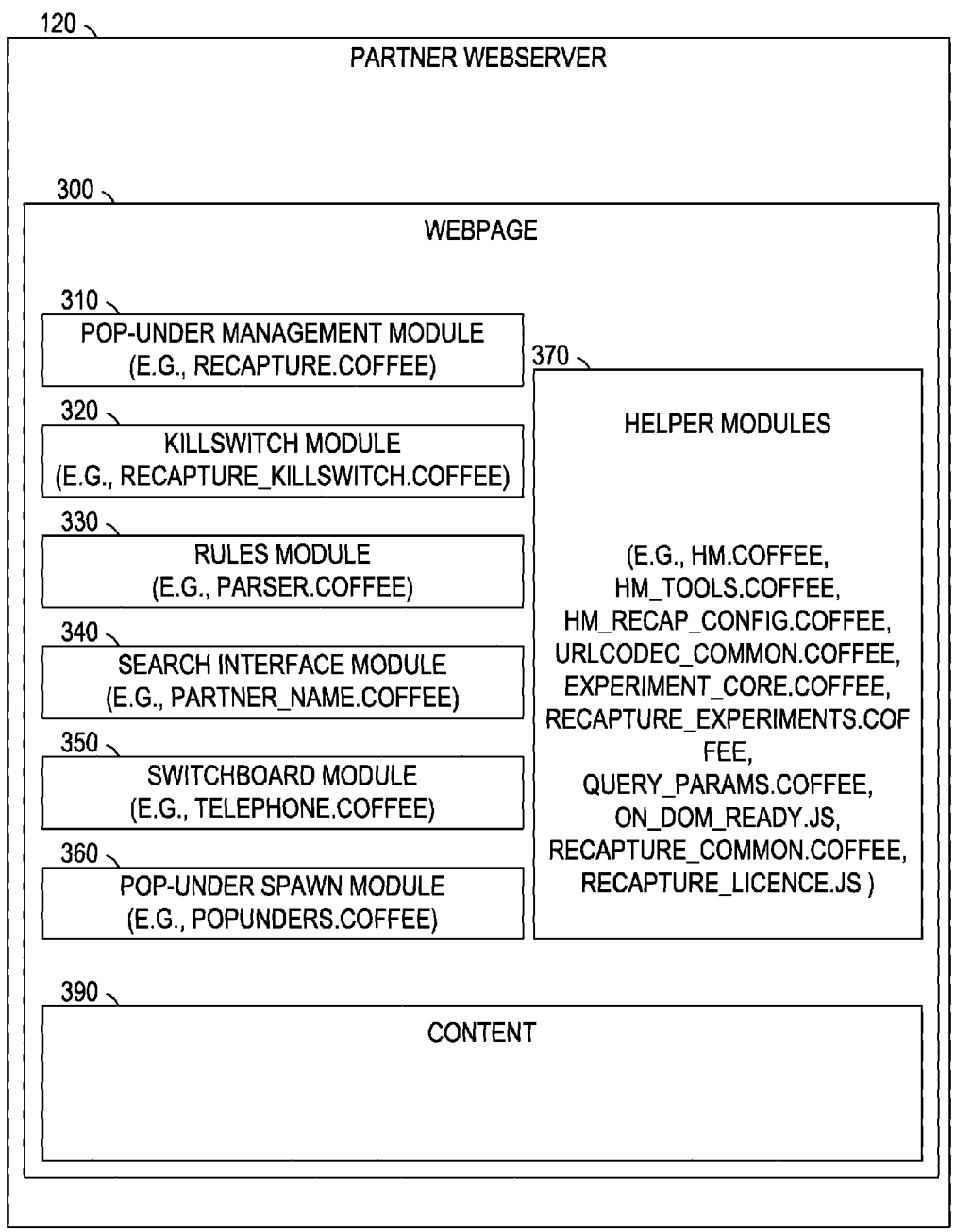
FIG. 3 is a block diagram illustrating components of a partner webserver, according to some example embodiments.

FIG. 3 is a block diagram illustrating components of the partner webserver 120 (e.g., operated by a travel airline website), according to some example embodiments. The partner webserver 120 is shown as including a webpage 300 that contains browser-executable code (e.g., in the form of one or more browser-executable scripts) generated by the pop-under machine 110 and received from the pop-under machine 110. For example, the partner webserver 120 may be configured to store and provide (e.g., serve) the webpage 300 with its browser-executable code embedded in the webpage 300. As examples of such browser-executable code, one or more of the following modules may be included in the webpage 300: a pop-under management module 310 (e.g., recapture.coffee, described below), a killswitch module 320 (e.g., recapture_killswitch.coffee, described below), a rules module 330 (e.g., parser.coffee, described below), a search interface module 340 (e.g., partner_name.coffee, described below), a switchboard module 350 (e.g., telephone.coffee, described below), a pop-under spawn module 360 (e.g., popunders.coffee, described below), and one or more helper modules 370 (e.g., hm.coffee, hm_tools.coffee, hm_recap_config.coffee, urlcodec_common.coffee, experiment_core.coffee, recapture_experiments.coffee, query_parems.coffee, on_dom_ready.js, recapture_common.coffee, and recapture_licence.js, described below). In addition, FIG. 3 illustrates content 390 of the webpage 300 being included in the webpage 300. The content 390 includes information (e.g., primary content, main content, or other content for human consumption instead of machine execution) to be conveyed by the webpage 300 beyond the browser-executable code supplied by the pop-under machine 110. According to various example embodiments, the browser-executable code illustrated in FIG. 3 may be generated by the pop-under machine 110 and provided by the pop-under machine 110 to the partner webserver 120 for inclusion in the webpage 300.

The pop-under management module 310 (e.g., recapture.coffee) may be or include a script that handles the overall project (e.g., management of a pop-under window). Its functions include establishing communication with a pop-under window before the pop-under window is shown to the user 132. This script also updates the pop-under window with new information (e.g., updated content) when the user 132 navigates between webpages (e.g., clicks from one webpage to another), such as when a user runs a new search. If there is no pop-under window ready to show, this script prepares (e.g., launches) one. If, because of one or more rules, the user 132 should not be targeted, this script disables the pop-under window. This script also loads an invisible iframe configured to communicate with the pop-under machine 110 and provide or otherwise enable provision of analytics about the pop-under window. If this iframe fails to load (e.g., because the pop-under machine 110 is unreachable), any pop-under window is disabled by this script. This may prevent a negative user experience in which the user 132 is shown a pop-under window that is linked to an unavailable website.

The killswitch module 320 (e.g., recapture_killswitch.coffee) may be or include a script that holds killswitch code. When included on a page (e.g., webpage 300), the script identifies any pop-under window currently open and closes it. Like the pop-under management module 310, the killswitch module 320 also loads an invisible iframe, with this invisible iframe being configured to communicate with the pop-under window and pass it a kill signal.

The rules module 330 (e.g., parser.coffee) may be or include a script that handles tasks specific to each partner website (e.g., partner webserver 120). In various example embodiments, this script handles the details of when to show users the pop-under window, based on the agreed-upon rules (e.g., spawning rules, window rules, or business rules agreed between an operator of the pop-under machine 110 and an operator of the partner webserver 120). Additionally, this script generates links (e.g., deep links) to the pop-under machine 110 for searches previously submitted to the partner site. Expandable on a per provider basis, this script communicates with the pop-under management module 310 to provide the pop-under window with search information for targeting the user 132. This search information may include one or more search criteria (e.g., search destination or kind of search, such as flights or hotels), as well as one or more portions of the content 390 of the webpage 300 (e.g., a creative element or image that is shown to the user).

The search interface module 340 (e.g., partner_name.coffee) may be or include a partner-specific extension to the rules module 330. The search interface module 340 handles obtaining (e.g., extracting) one or more pieces of search information (e.g., search criteria, search results, or both) from webpages served by the partner webserver 120 and generating links (e.g., deep links) to the pop-under machine 110 (e.g., to the travel search website that corresponds to the pop-under machine 110).

The switchboard module 350 (e.g., telephone.coffee) may be or include a script that functions as a switchboard between or among the following modules: the rules module 330 that determines what the user 132 searched for, the iframe that passes analytics information back to the pop-under machine 110, and the pop-under content module 220 that generates the pop-under window. In some example embodiments, two or more communication protocols are used by the switchboard module 350. The first protocol may use the window.postMessage application programming interface (API), which allows the pop-under management module 310 to securely communicate with the analytics iframe. The second protocol may use local storage of the user's browser (e.g., browser 400, discussed below with respect to FIG. 4) to communicate with the pop-under window. The use of local storage may ensure or otherwise facilitate compatibility with Internet Explorer® browsers as old as version 8 (e.g., IE8), in addition to compatibility with browsers such as Chrome®, Firefox®, and Safari®.

The pop-under spawn module 360 (e.g., popunders.coffee) may be or include a script that provides an API that opens or otherwise enables opening a pop-under window in a manner that avoids browsers' built-in guards for doing so upon closure of the browser window (e.g., pop-up blockers, pop-under blockers, or both).

The helper modules 370 may include one or more of the following scripts. An hm.coffee script may be included to allow modules to access other modules, such as allowing partner-specific code (e.g., one or more partner-specific scripts) in the search interface module 340 to access more general page scraping code in the rules module 330. In some example embodiments, the hm.coffee script is omitted and all applicable modules are contained in a single file. In alternative example embodiments, the applicable modules are provided in separate files (e.g., to facilitate reading, updating, clarity, or comprehension), and the hm.coffee script is included (e.g., as a separate file).

The helper modules 370 may include an hm_tools.coffee script that provides one or more utility functions to the pop-under window. For example, this script may provide a shorter, faster, and more reliable (e.g., less error-prone) way of accessing the document object model (DOM) of the webpage 300 and making asynchronous JavaScript and eXtensible Markup Language (AJAX) requests than other tools (e.g., jQuery or Zepto.js). Additionally, this script may prevent version conflict problems with general-purpose libraries. This script may track the main pop-under window tag (e.g., Recapture Portal tag) and the pop-under content module 220, which may report or otherwise enable the reporting of analytics (e.g., via the analytics module 210). This script may also provide an interface to loading the invisible proxy iframe used to communicate analytics with the pop-under machine 110. Furthermore, this script may simplify communications with local storage at the device 130 (e.g., memory allocated to the user's browser). In some example embodiments, such simplified communications may significantly enhance inter-window (e.g., cross-window) communications (e.g., as explained further below with respect to the switchboard module 350).

The helper modules 370 may include an hm_recap_config.coffee script that provides basic configuration parameters. These basic configuration parameters may configure the device 130 to operate in a testing mode (e.g., sending clicks from the pop-under window to localhost) or in a production mode (e.g., sending clicks from the pop-under window to the pop-under machine 110).

The helper modules 370 may include an urlcodec_common.coffee script that manages (e.g., parses or generates) locators (e.g., a uniform resource locators (URLs)) of content hosted by the pop-under machine 110 or otherwise available from the network-based system 105. The script is configured to encode such locators (e.g., as network destinations at the travel search website corresponding to the pop-under machine 110), as well as other related information (e.g., search criteria submitted by the user 132, such as price range or cabin class for flights).

The helper modules 370 may include an experiment_core.coffee script that determines the best performing user experience (e.g., as provided by differing or competing versions of the pop-under window). In some example embodiments, it is helpful to provide different experiences to different groups (e.g., cohorts) of users. This script permits such so-called "A/B tests" to be run, and the script is extendable to support experiments with multiple different partner websites. For example, this script may be used to experimentally discover the ideal size of a map on webpages showing results of searches for hotels. In certain example embodiments, this script ensures that the same users remain part of the same cohort when they return to the partner website. This may be performed by grouping (e.g., clustering or bucketing) users in A/B tests based on an initial seed value. In various example embodiments, this script also handles tracking those cohorts for later analysis. For testing purposes and to ensure all tests are working properly, this script may also provide a way of overriding the A/B test bucket via query parameters in the URL.

The helper modules 370 may include an recapture_experiments.coffee script. It may be in the mutual interest of the operator of the pop-under machine 110 (e.g., the operator of the travel search website) and the operator of the partner webserver 120 (e.g., the operator of the partner website) that users who see the pop-under window click through at as high a rate as possible. More clickthroughs may result in more bookings, revenue, and data for the operators of both websites. However, it may be difficult to predict in advance what will result in the highest clickthrough rates (e.g., whether to display an invitation to "Compare options to San Francisco" or an invitation to "Compare flights to SFO"). Accordingly, this script extends the general A/B testing techniques of the experiment_core.coffee script by performing or otherwise enabling specialized testing of different headlines or images in the pop-under window. In some example embodiments, such specialized testing is performed only by advance agreement between the operator of the pop-under machine 110 and the operator of the partner webserver 120.

The helper modules 370 may include a query_params.coffee script that provides a simple way of reading search criteria (e.g., query parameters). For example, such search criteria may be read from a URL (e.g., sent from a browser to request the webpage 300). In some example embodiments, this script may provide or otherwise enable a manual override of A/B tests for debugging purposes.

The helper modules 370 may include an on_dom_ready.js script. In some example embodiments, this script is a JavaScript file that ensures that other modules do not examine the webpage 300 or communicate any analytics back to the pop-under machine 110 until after the partner's webpage 300 has finished loading into a browser.

The helper modules 370 may include a recapture_common.coffee script that contains common code used between the pop-under management module 310 and the killswitch module 320. In some example embodiments, this common code includes methods (e.g., object-oriented member functions associated with an object of a class, defined inside or outside of the class) of identifying permitted browsers, checking dependencies, and setting up error logging.

The helper modules 370 may include a recapture_licence.js script that is configured to preserve copyright notices and non-modification notices in one or more other modules, even when one or more of the other modules (e.g., distributed as files) are compiled, reduced in size, or both.

On the pop-under machine 110, the analytics module 210 (e.g., recap_proxy.coffee) may be or include a script configured to ensure that users can be identified and that one or more of the various events in the pop-under window can be tracked. Accordingly, the analytics module 210 may be configured to perform the identification of such users, the tracking of such events, or both. In some example embodiments, the script uses an iframe (e.g., invisible iframe) that points to the network domain for the pop-under machine 110 (e.g., the network domain of the network-based system 105). This may have the effect of ensuring that cookies and API calls are kept on that network domain. In certain example embodiments, this script may expose an interface to these methods via the switchboard module 350.

The pop-under content module 220 (e.g., portal.coffee) may be or include a script that generates or updates the content of the pop-under window. In some example embodiments, the pop-under window contains a creative element (e.g., an advertisement image) and performs one or more partner-approved AB tests to determine the most effective creative elements. This script may be hosted by the pop-under machine 110, for example, to ensure that the pop-under machine 110 can identify users and host its own stylesheets. This script manages what is shown in the pop-under window itself. Specifically, in some example embodiments, this script ensures that the pop-under window contains a current advertisement to be displayed, a URL (e.g., with one or more search criteria obtained from the webpage 300) that links to the travel search website (e.g., operated by the operator of the pop-under machine 110), or both. In addition, the script may communicate with the pop-under management module 310 through the switchboard module 350. This may have the effect of ensuring that the pop-under window is updated if the user's search changes (e.g., if new search criteria is submitted by the user 132). This script may also facilitate keeping the pop-under window hidden (e.g., obscured by the user's currently active browser window, minimized in size, or both) until the user 132 closes the partner webpage 300. For example, if the user 132 moves the browser on the screen while the browser displays the partner webpage 300, this script may ensure (e.g., by causation) that the pop-under window moves behind the browser on the screen, so that the pop-under window does not become visible too soon (e.g., prior to the user closing the browser or otherwise exiting the website presented therein).

The pop-under code module 230 (e.g., base_portal_creative.coffee) may be or include a script that generates or otherwise enables generation of hypertext markup language (HTML) from the pop-under window itself. This script may provide a fast and simple way of generating the HTML for a selected creative element (e.g., an advertisement image determined to be most effective or most likely to be effective) based on one or more A/B tests applicable to the user 132. The script may use one or more templates provided by the browser code module 240. This may have the effect of making the templates easily readable and quickly updatable to the latest partner-approved creative element (e.g., advertisement image).

The browser code module 240 (e.g., drykup.coffee) may be or include a script that provides a customized experience to users (e.g., user 132) while ensuring speed. In some example embodiments, it may be important to generate HTML from the user's current browser (e.g., the currently active web browser of the user 132). This may have the effect of providing or otherwise ensuring programmatic control of what the user 132 is shown in the pop-under window. In some example embodiments, there is no need for additional network requests that could slow down the user's experience. This script may provide or otherwise facilitate a fast, minimal, and elegant way of creating HTML templates (e.g., in CoffeeScript). For example, this script may be used to display flight search pages, hotel search pages, or both.

The cohort module 250 (e.g., md5.js) may be or include a script configured to keep users in the same groups (e.g., cohorts) or otherwise ensure that users are kept in the same groups during A/B testing. This may have the effect of ensuring that user behavior can be accurately measured and compared to users in different cohorts. In some example embodiments, this script generates a consistent md5 value for users (e.g., thus enabling the experiment_core.coffee script to consistently bucket users into the appropriate cohort). This script may be hosted in the proxy iframe and the pop-under window. Moreover, the script may be used (e.g., invoked) by the analytics module 210, the pop-under content module 220, or both.

Figure 4:
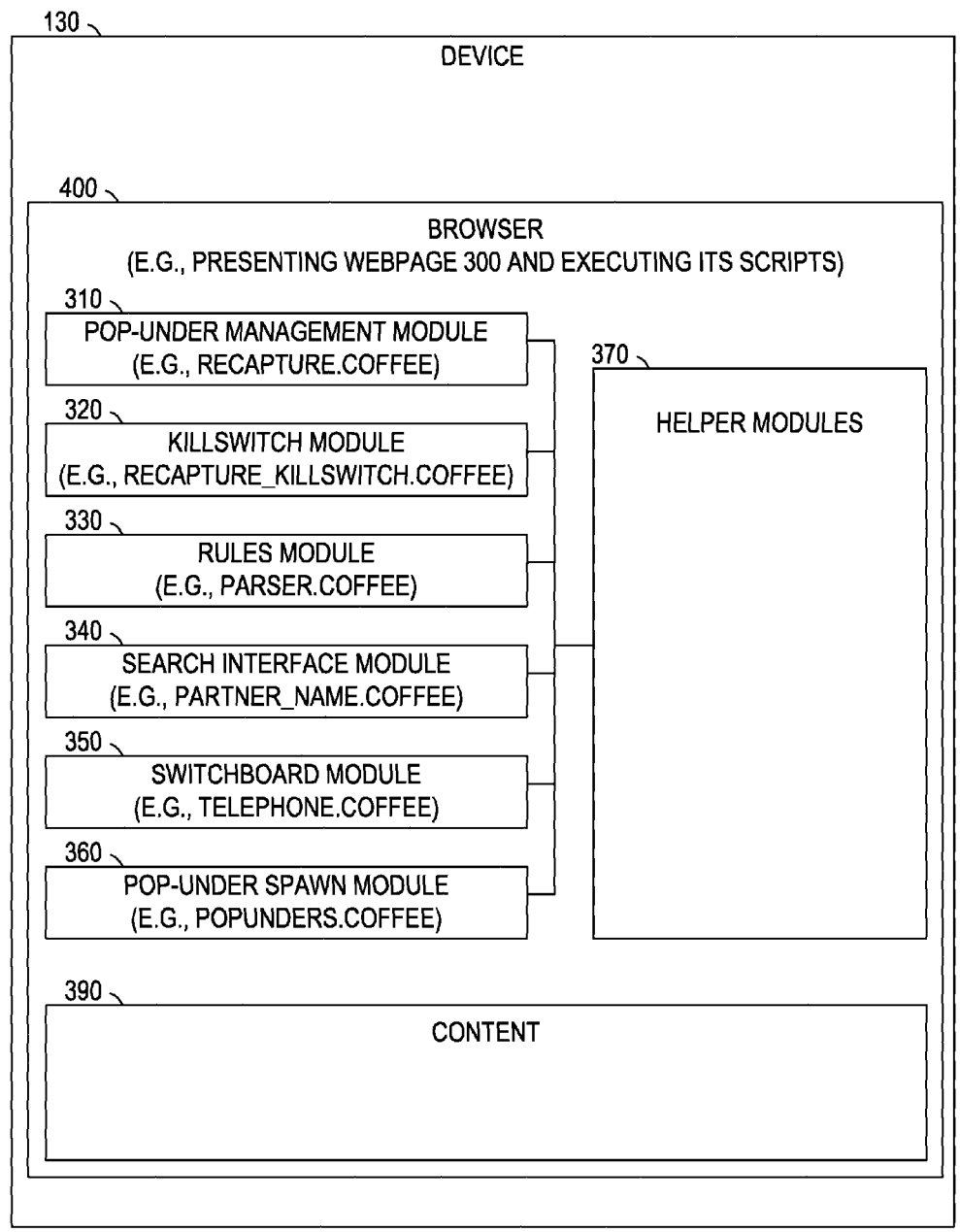
FIG. 4 is a block diagram illustrating components of a device, according to some example embodiments.

FIG. 4 is a block diagram illustrating components of the device 130, according to some example embodiments. In the example shown in FIG. 4, the device 130 has requested and received the webpage 300 from the partner webserver 120, and the device 130 is executing some or all of the browser-executable code contained in the webpage 300. Accordingly, FIG. 4 illustrates a browser 400 (e.g., a web browser in the form of a software application configured to request and present various web content) with one or more of the modules described above with respect to FIG. 3. Some or all of the browser-executable code received in the webpage 300 may have been previously generated by the pop-under machine 110 and previously provided to the partner webserver 120 by the pop-under machine 110 for inclusion in the webpage 300. As illustrative examples, the browser 400 may include (e.g., store and execute) the pop-under management module 310, the killswitch module 320, the rules module 330, the search interface module 340, the switchboard module 350, the pop-under spawn module 360, one or more of the helper modules 370, or any suitable combination thereof, all configured to communicate with each other (e.g., via a bus, shared memory, or a switch). In addition, FIG. 4 illustrates the content 390 of the webpage 300 being included (e.g., stored, executed, or presented) by the browser 400 that is executing on the device 130.

The various modules described with respect to FIGS. 2-4 may configure the device 130 to allow a targeted advertisement that persists beyond a searching session (e.g., a flight search session or a hotel search session). That is, the targeted advertisement may be spawned during a first searching session and presented after the first searching session has ended and a second searching session has begun. The targeted advertisement may be delivered via a pop-under window, once the user 132 exits the first searching session.

Figure 5:
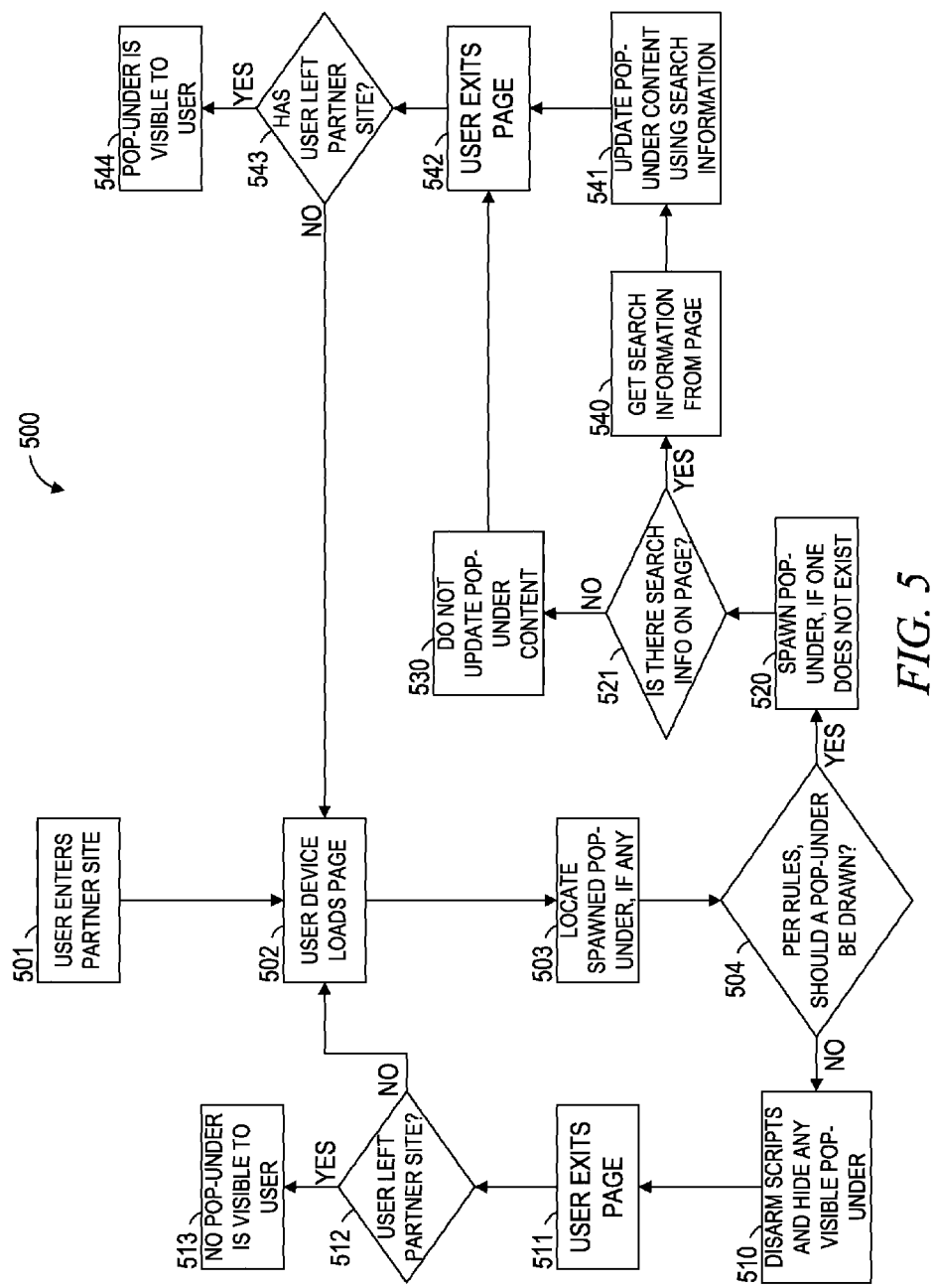
FIG. 5 is a flowchart illustrating operations of the pop-under machine in performing a method of presenting a pop-under window, according to some example embodiments.

FIG. 5 is a flowchart illustrating operations of the pop-under machine 110 in performing a method 500 of presenting a pop-under window, according to some example embodiments. In particular, FIG. 5 is a control flow diagram showing operations performed by the device 130, as configured by one or more of the modules discussed above with respect to FIG. 4, in response to user interaction (e.g., by the user 132 in operating the device 130).

At operation 501, the user 132 visits (e.g., enters) a partner website. For example, the user 132 may cause the device 130 to request that the partner webserver 120 provide the webpage 300 to the device 130 for presentation by the browser 400.

At operation 502, the device 130 loads the requested webpage 300. As a result, the browser-executable code included in the webpage 300 is also loaded onto the device 130, and the device 130 begins executing some or all of the browser-executable code. As noted above, the browser-executable code may include one or more of the pop-under management module 310, the killswitch module 320, the rules module 330, the search interface module 340, the switchboard module 350, the pop-under spawn module 360, and the helper modules 370.

At operation 503, the pop-under management module 310 checks whether a previously spawned pop-under window exists. For example, the pop-under management module 310 may determine that a pop-under window has already been spawned and still exists on the display of the device 130.

At operation 504, the pop-under management module 310 determines whether a pop-under window should be spawned (e.g., an affirmative determination if no other pop-under window already exists, no applicable rules are violated, and no killswitch module 320 is present in the webpage 300). For example, the pop-under management module 310 may invoke one or more of the following modules, if present, to perform operation 504: the killswitch module 320, the rules module 330, and the search interface module 340.

At operation 510, no pop-under window should be spawned (e.g., as determined in operation 504), and the pop-under management module 310 terminates execution of the browser-executable code. The pop-under management module 310 may also hide or close any existing pop-under window (e.g., as determined in operation 503) from becoming visible to the user.

At operation 511, the user 132 exits the webpage (e.g., by closing the browser 400 or loading an unrelated webpage from a website not served by, or otherwise unrelated to, the partner webserver 120).

At operation 512, the pop-under management module 310 detects whether the user 132 has left the partner website. For example, the pop-under management module 310 may detect the browser 400 being closed or directed to present a webpage from an unrelated website (e.g., a website that is not served by, or is otherwise unrelated to, the partner webserver 120).

At operation 513, the user 132 has left the partner website, and no pop-under window is visible to the user 132. This may be because no pop-under window was ever spawned or because any previously spawned pop-under window has been hidden or closed in operation 510.

At operation 520, a pop-under window should be spawned (e.g., as determined in operation 504), and the pop-under management module 310 causes a pop-under window to be spawned by the device 130 (e.g., if no such pop-under window already exists). For example, the pop-under management module 310 may invoke the pop-under spawn module 360 to perform operation 520.

At operation 521, the pop-under management module 310 determines whether there is any search information (e.g., search criteria submitted by the user 132, or search results obtained from such search criteria) stored somewhere in the webpage 300 (e.g., displayed in the webpage 300 or incorporated into a locator of the webpage 300), the browser 400 (e.g., the currently active browser window or a data cookie thereof), or both. For example, the pop-under management module 310 may invoke the search interface module 340 to perform operation 521.

At operation 530, there is no search information on the webpage 300 (e.g., as determined in operation 521), and the pop-under management module 310 does not update the spawned pop-under window. For example, the contents of the pop-under window may be left unchanged by the pop-under management module 310. Accordingly, any default content from the initial spawning of the pop-under window remains presented within the pop-under window.

At operation 540, there is search information stored somewhere in the webpage 300 (e.g., as determined in operation 521), and the pop-under management module 310 obtains such search information from the web page 300 (e.g., contents of the webpage 300 or a locator of the webpage 300), the browser 400 (e.g., the currently active browser window or a data cookie thereof), or both. For example, the pop-under management module 310 may invoke the search interface module 340 to perform operation 540.

At operation 541, the pop-under management module 310 updates the previously spawned pop-under window (e.g., spawned in operation 520) by generating or updating the content of the pop-under window based on the search information obtained in operation 540. For example, the pop-under management module 310 may access the pop-under machine 110 and invoke one or more of the following modules, if present, to perform operation 541: the pop-under content module 220, the pop-under code module 230, the browser code module 240, and the cohort module 250.

At operation 542, the user 132 exits the webpage 300. For example, the user 132 may perform operation 542 by closing the browser 400 or loading an unrelated webpage (e.g., a webpage from a website not served by, or otherwise unrelated to, the partner webserver 120).

At operation 543, the pop-under management module 310 detects whether the user 132 has left the partner website (e.g., in its entirety). For example, the pop-under management module 310 may detect the browser 400 being closed or directed to present a webpage from an unrelated website (e.g., a website that is not served by, or is otherwise unrelated to, the partner webserver 120). If the user 132 has not left the partner website (e.g., the browser 400 loads another webpage from the same partner website), operation 502 may be performed next.

At operation 544, the user 132 has left the partner website (e.g., by closing the browser 400), and the previously spawned pop-under window is now visible to the user 132. As noted above, the previously spawned pop-under window may include content that was generated or updated in operation 541.

In some example embodiments, the browser-executable code discussed above with respect to FIGS. 3 and 4 is implemented as a "recapture portal script." When executed by the browser 400, such a script may operate as follows. Once included on the page, the script (e.g., in the form of one or more browser tags) waits for the page to finish loading. Upon doing so, the script loads an iframe that is usable to communicate with the pop-under machine 110 in a secure manner. Next, one or more rules may be evaluated. If no pop-window should be shown (e.g., if the user 132 or user's current webpage 300 is not applicable to the one or more rules, or if the partner invokes the killswitch module 320), no pop-under window is launched, and any previously spawned pop-under window (e.g., from a previous session) is closed, guaranteeing that the user 132 will not see it.

If, however, the pop-under window should be shown, the script may generate a locator (e.g., a URL) of supplemental content that corresponds to the most recent search criteria that the user submitted to the partner website. This locator may then be provided to the pop-under window, so that, if the user 132 closes his current browser window (e.g., closes the current window of the browser 400), an image in the pop-under window links to a dynamically generated supplemental webpage that is served by the pop-under machine 110 or is otherwise available from its network-based system 105.

Upon leaving the partner's website, if the pop-under window should be shown and has not been already closed via the killswitch module 320, the device 130 presents the pop-under window (e.g., as a recapture portal that delivers a targeted advertisement to the user 132). The pop-under window may include customized content (e.g., a custom creative element, such as a custom image) agreed upon between the operator of the pop-under machine 110 and the operator of the partner webserver 120.

Figure 6:
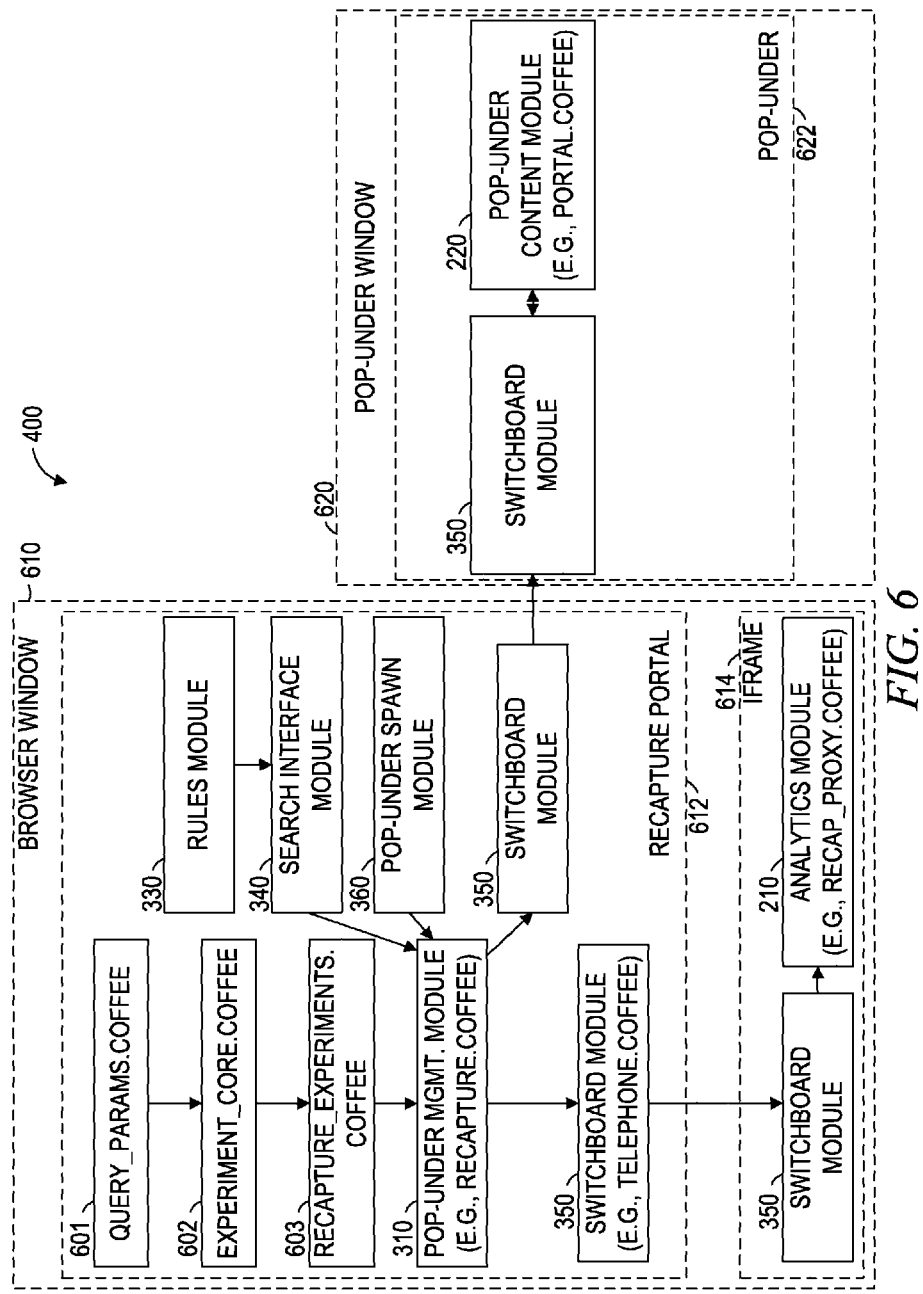
FIG. 6 is a conceptual diagram illustrating data flows among modules, according to some example embodiments.

FIG. 6 is a conceptual diagram illustrating data flows among modules, according to some example embodiments. As shown by item 601, execution of the query_params.coffee script (e.g., within or among the helper modules 370) provides data to the experiment_core.coffee script (e.g., within or among the helper modules 370). As shown by item 602, execution of the experiment_core.coffee script provides data to the recapture_experiments.coffee script (e.g., within or among the helper modules 370). As shown by item 603, execution of the recapture_experiments.coffee script provides data to the pop-under management module 310.

As also shown in FIG. 6, execution of the rules module 330 provides data to the search interface module 340, whose execution provides data to the pop-under management module 310. Similarly, execution of the pop-under spawn module 360 provides data to the pop-under management module 310.

The pop-under management module 310 communicates with the analytics module 210 via the switchboard module 350 (e.g., via first and second instances of the switchboard module 350). In addition, the pop-under management module 310 may communicate with the pop-under content module 220 via the switchboard module 350 (e.g., via third and fourth instances of the switchboard module 350).

As shown in FIG. 6, the browser 400 may include a browser window 610. The browser window 610 may include a recapture portal 612, which may be stored and executed within a non-displayed (e.g., invisible) portion of the browser window 610. As noted above, the browser window 610 may include an iframe 614 (e.g., an invisible iframe) for the analytics module 210. The browser 400 may include a pop-under window 620 (e.g., as separate browser window), which may contain a corresponding pop-under 622 (e.g., content presented or to be presented in the pop-under window 620), and the pop-under content module 220, the switchboard module 350, or both, may operate within a non-displayed (e.g., invisible) portion of the pop-under window 620.

To implement one or more the methodologies discussed herein, the partner webserver 120 may be configured to modify the webpage 300. In the following example embodiments, the pop-under machine 110 is accessible via (e.g., using) URLs that begin with "https://www.hipmunk.com."

To enable the recapture portal 612 on the partner's website, the recapture JavaScript may be loaded, for example, as follows in the header portion (e.g., denoted by the "<head>" tag and the </head> tag) of each relevant webpage (e.g., webpage 300).

Code:

```
<script type="text/javascript" src="{recapture portal javascript location}">
</script>
```

Example:

```
<head>
...
<script type="text/javascript"
src="https://www.hipmunk.com/recapture/060528ab">
</script>
...
</head>
```

The killswitch module 320 may be implemented on one or more webpages (e.g., webpage 300) to prevent the pop-under window 620 from being invoked from those webpages. To enable the recapture portal 612 on the partner's website, the killswitch JavaScript may be loaded, for example, as follows in the header portion (e.g., denoted by the "<head>" tag and the </head> tag) of each relevant webpage (e.g., webpage 300).
Code:

```
<script type="text/javascript" src="{recapture portal killswitch location}>
</script>
Example:
<head>
...
<script type="text/javascript"
src="https://www.hipmunk.com/recap/killswitch/060528ab">
</script>
...
</head>
```

Regarding performance, in some example embodiments, script performance (e.g., JavaScript performance) may be affected by file size and execution speed. Enhancement of the former may be facilitated by minimizing inclusion of unneeded code and serving JavaScript in minimized form (e.g., "minified") and compressed (e.g., via gzip). By not including unnecessary third-party code or modules, the one or more script files (e.g., Recapture Portal file) provided by the pop-under machine 110 to the partner webserver 120 may be very small in size. In certain example embodiments, one or more of the modules discussed with respect to FIGS. 3 and 4 may be loaded into the browser 400 asynchronously, which may prevent page load times (e.g., for the webpage 300) from being adversely affected. The control flow of the various scripts discussed above may be asynchronous and run via callbacks (e.g., in contrast with a polling method), which may have the effect of avoiding or minimizing any slowing of the user's interactions with the partner website. In addition, some example embodiments may start inspection of the document object model (DOM) of the webpage 300 via element identifier (element ID) queries, for enhanced speed.

Regarding security, in some example embodiments, the browser-executable modules discussed above with respect to FIGS. 3 and 4 may be coded in a manner that implements one or more of the following security measures. Code may be independent of the use of eval, and consequently may prevent vulnerabilities to code injection. Code may use anonymous functions to compile modules (e.g., via use of CoffeeScript), which may isolate the code from malicious modification from outside sources (e.g., browser toolbars, spyware, or other malware). During page inspection (e.g., of the webpage 300), the information stored on the page is about the current search (e.g., most recent search criteria or most recent search result) and not about the user 132. This may have the effect of preventing the browser-executable modules from storing or communicating personal information about the user 132 (e.g., email address, credit card number, or frequent flyer number). Since network requests to the pop-under machine 110 are performed via a proxy iframe, the pop-under machine 110 and the partner webserver 120 are protected from cross-site scripting exploits. Furthermore, the pop-under machine 110 (e.g., via its hosted modules discussed with respect to FIG. 2) may be configured to ignore messages not sent from the browser-executable modules discussed with respect to FIGS. 3 and 4, which may have the effect of preventing malicious control of the pop-under window 620. For example, third-party communications from window.postMessage may be ignored by the pop-under machine 110.

Figure 7:
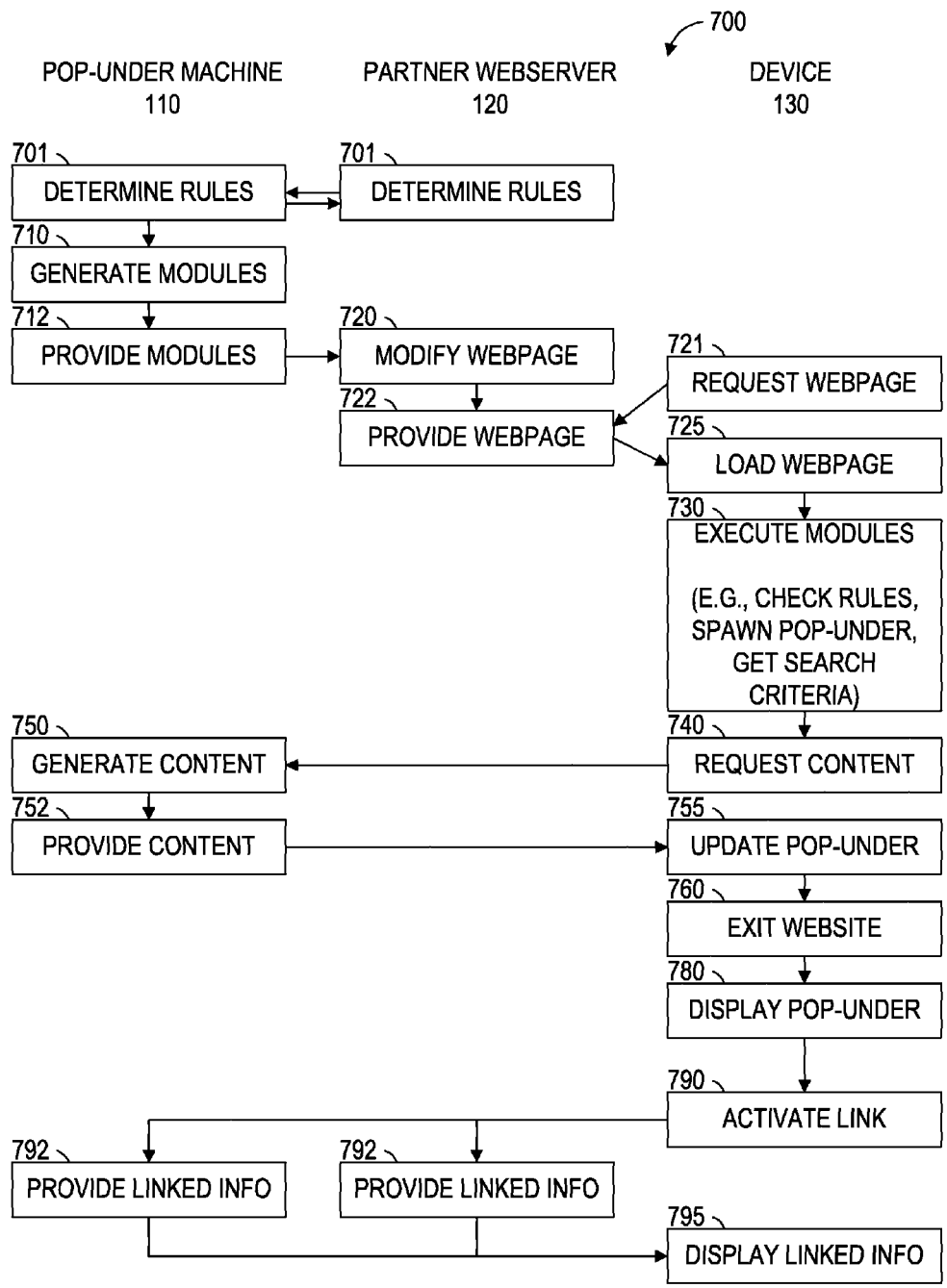
FIGS. 7-9 are flowcharts illustrating operations in performing a method of presenting a pop-under window, according to some example embodiments.
Figure 8:
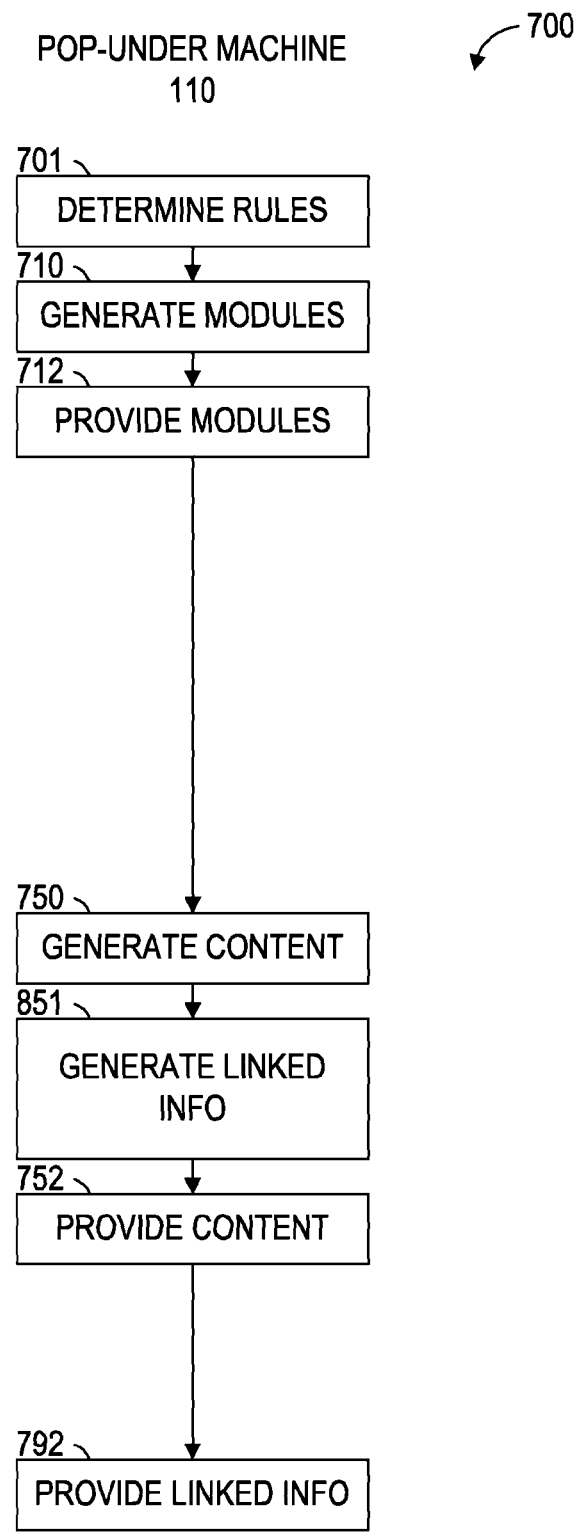
Figure 9:
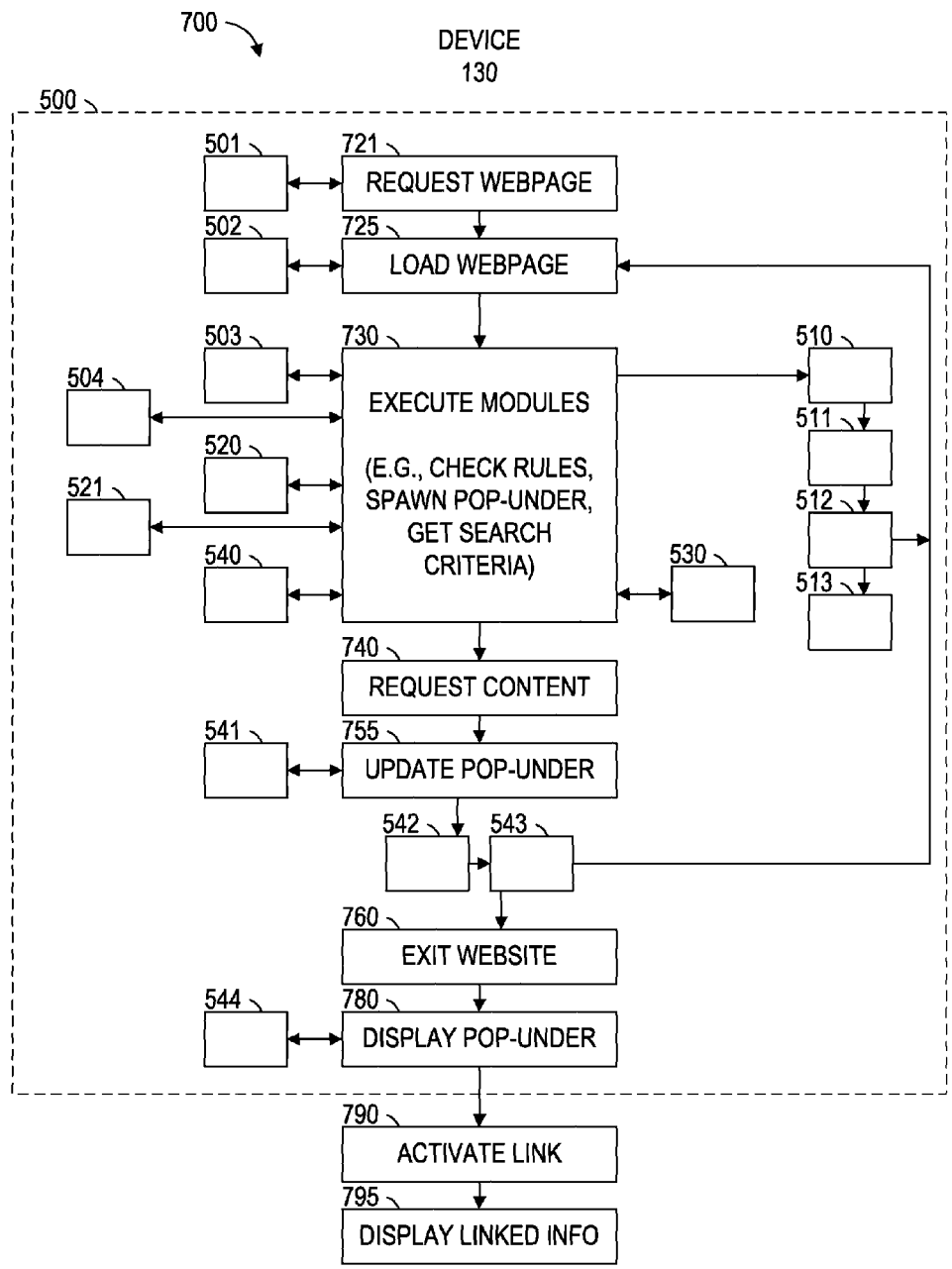

FIGS. 7-9 are flowcharts illustrating operations in performing a method 700 of presenting the pop-under window 620, according to some example embodiments. As indicated at the top of FIG. 7, various operations in the method 700 may be performed by the pop-under machine 110, the partner webserver 120, the device 130, or any suitable combination thereof. Moreover, various operations of the method 700 may be performed using one or more of the modules (e.g., one or more scripts executing on one or more processors) described above with respect to FIGS. 2-4. As shown in FIG. 7, the method 700 may include operations 701, 710, 712, 720, 721, 722, 725, 730, 740, 750, 752, 755, 760, 780, 790, 792, and 795, or any subset thereof.

In operation 701, one or more rules are determined (e.g., for subsequent inclusion in the rules module 330). Operation 701 may be performed by the pop-under machine 110, the partner webserver 120, or any suitable combination thereof. In some example embodiments, the partner webserver 120 determines a rule according to one or more preferences, profiles, or configuration parameters agreed upon between a first entity (e.g., a company or person) that operates the partner webserver 120 and a second entity that operates the pop-under machine 110, and communicates the rule to the pop-under machine 110. For example, a rule may be specified by an administrator of the partner webserver 120 and then sent to the pop-under machine 110 for storage and subsequent use. In certain example embodiments, the support module 260 of the pop-under machine 110 determines the rule (e.g., in accordance with one or more preferences, profiles, or configuration parameters agreed upon between an operator of the partner webserver 120 and an operator of the pop-under machine 110). In various example embodiments, the support module 260 accesses the rule from the database 115.

In operation 710, the support module 260 of the pop-under machine 110 generates the browser-executable code that will be provided to the partner webserver 120. As noted above, the browser-executable code may include any one or more of the modules discussed above with respect to FIGS. 3 and 4. Generation of any module may include outputting a program or script as a result of a compilation process, validation process, error-checking process, or other machine-performed process.

In operation 712, the support module 260 of the pop-under machine 110 provides the generated browser-executable code (e.g., from operation 710) to the partner webserver 120. For example, operation 712 may be performed as a response to a request received from the partner webserver 120 for provision of such browser-executable code. In some example embodiments, such a request accompanied one or more rules sent from the partner webserver 120 to the pop-under machine 110 in operation 701.

In operation 720, the partner webserver 120 modifies the webpage 300 by incorporating the received browser-executable code into the webpage 300. For example, the webpage 300 may be modified by inserting the browser-executable code into a non-displayable portion of the webpage 300 (e.g., metadata or other hidden data). The modification of the webpage 300 may include marking the browser-executable code as such or otherwise indicating the browser-executable code is to be executed when a browser (e.g., browser 400) loads (e.g., opens or launches) the webpage 300 for presentation to a user (e.g., user 132).

In operation 721, the device 130 requests the webpage 300 from the partner webserver 120. For example, the user 132 may operate the device 130 in a manner that causes the browser 400 to activate a link (e.g., URL) to the webpage 300.

In operation 722, the partner webserver 120 provides the webpage 300 to the device 130. This may be performed in response to the request (e.g., activation of the link) received by the partner webserver 120 in operation 721.

In operation 725, the device 130 (e.g., via the browser 400) loads the webpage 300 received from the partner webserver 120. At this point, the received webpage 300 includes the browser-executable code generated by the pop-under machine 110 in operation 710.

In operation 730, the browser 400 on the device 130 executes one or more modules of the browser-executable code received with the webpage 300 (e.g., in operation 725). As shown in FIG. 7, execution of such modules may include checking one or more rules (e.g., as discussed above with respect to operation 504), spawning the pop-under window 620 (e.g., as discussed above with respect to operation 520), obtaining one or more search criteria (e.g., as discussed above with respect operation 540), or any suitable combination thereof. In instances where the pop-under window 620 is spawned (e.g., with default content or with no content) or otherwise already exists, the method 700 may proceed to operation 740.

In operation 740, some or all of the browser-executable code (e.g., pop-under content module 220, the switchboard module 350, or both) causes the device 130 to request and obtain content for the spawned pop-under window 620, and this content may be requested and obtained from the pop-under machine 110. In particular, the device 130 may request content that is generated or otherwise provided based on one or more search criteria previously submitted to the partner webserver 120 via the browser 400 (e.g., via the browser window 610). For example, one or more of the most recent search criteria previously submitted by the user 132 via the browser 400 may form all or part of a basis for obtaining the content (e.g., one or more additional search results, one or more targeted advertisements, or any suitable combination thereof). As noted above, once obtained, this content may be incorporated into the spawned pop-under window 620 (e.g., for presentation when the user 132 exits the website of the partner webserver 120).

In operation 750, the pop-under machine 110 (e.g., via the pop-under content module 220, the switchboard module 350, the support module 260, or any suitable combination thereof) generates the content requested in operation 740. As noted above, the content may be generated based on a search criterion (e.g., as part of one or more search criteria) previously submitted via the browser 400. The search criterion have been included in the request and accordingly received by the pop-under machine 110. As examples, the generated content may include one or more additional search results (e.g., search results obtained based on the search criterion but not previously presented in the browser window 610), one or more targeted advertisements (e.g., ads retrieved based on the search criterion), or any suitable combination thereof. Such a search result may take the form of text, an image, a video clip, an audio clip, or any suitable combination thereof.

In operation 752, the pop-under machine 110 (e.g., via the pop-under content module 220, the switchboard module 350, the support module 260, or any suitable combination thereof) provides the content generated in operation 750 to the device 130. Operation 752 may be performed in response to the request sent by the device 130 in operation 740.

In operation 755, some or all of the browser-executable code (e.g., the pop-under content module 220, the switchboard module 350, or both) causes the device 130 to update the pop-under window 620 using (e.g., by including) some or all of the content provided in operation 752. This may have the effect of replacing any default content of the pop-under window 620 with updated content received from the pop-under machine 110.

In operation 760, the user 132 exits the website of the partner webserver 120. For example, the user 132 may cause the browser window 610 of the browser 400 to be closed (e.g., exited). As another example, the user 132 may command the browser window 610 to load a different website (e.g., a set of webpages served by a different webserver from a different network domain). Accordingly, the browser window 610 may cease to present the webpage 300 or any other part of the website of the partner webserver 120.

In operation 780, the pop-under window 620, including its updated content (e.g., from operation 755), is displayed by the device 130 (e.g., to the user 132). In instances where the pop-under window 620 was initially spawned fully or partially obscured by the browser window 610, and where the browser window 610 was closed in operation 760, the pop-under window 620 may become fully visible as a result of the closure of the browser window 610. In instances where the pop-under window 620 was initially spawned fully or partially obscured by the browser window 610, and where the browser window 610 was commanded to load a different website, the pop-under window 620 may change to a pop-up window that becomes fully visible, even though the browser window 610 is still open.

In operation 790, the user 132 of the device 130 activates a link (e.g., URL) associated with the pop-under window 620. For example, some or all of the contents of the pop-under window 620 may be or include a search result (e.g., an additional search result, obtained based on the one or more search criteria discussed above with respect to operation 730, but not previously presented in the browser window 610 of the browser 400) that is linked to additional information regarding that search result (e.g., a further webpage that describes the search result in greater detail, enables reservation to purchase of the search result, or both). In such a situation, a click, a touch, a voice command, or other selection that indicates the search result may activate a link and cause the browser 400, the device 130, or both, to request that additional information. In some example embodiments, the additional information is hosted by the partner webserver 120, in which case the partner webserver 120 may respond by performing operation 792. In other example embodiments, the additional information is hosted by the pop-under machine 110, in which case the pop-under machine 110 may respond by performing operation 792.

In operation 792, the pop-under machine 110 (e.g., via the support module 290 or another module configured to provide information, such as webpages) or the partner webserver 120 provides the device 130 with the information requested by the activation of the link in operation 790. In situations where the partner webserver 120 performs operation 792, this may have the effect of providing the search result discussed above with respect to operation 790, which may have the effect of recapturing attention, interest, business, or any suitable combination thereof, of the user 132, despite the user 132 deciding to exit the website of the partner webserver 120 in operation 760.

In operation 795, the device 130 receives the information provided in operation 792, and the browser 400 on the device 130 presents (e.g., displays) the provided information. This may have the effect of displaying a further webpage that describes the search result discussed above with respect operation 790.

As shown in FIG. 8, at least a portion of the method 700 may form all or part of a set of operations performed by the pop-under machine 110. As shown in FIG. 8, the pop-under machine 110 may perform operations 710, 712, 750, and 752 (e.g., as a separate method). According to various example embodiments, the pop-under machine 110 may additionally perform one or more of operation 701 (e.g., as discussed above with respect to FIG. 7), operation 851, and operation 792 (e.g., as discussed above with respect to FIG. 7).

In operation 701, as noted above, the pop-under machine 110 (e.g., via the support module 290) determines one or more rules (e.g., rules that may subsequently be incorporated into the rules module 330). As discussed above, one or more of the rules may govern the spawning of windows from the browser 400 (e.g., govern conditions under which the pop-under window 620 is to be spawned or blocked from spawning). Thus, the one or more rules may be or include spawning rules, window rules, or business rules that have been previously agreed-upon between an entity that operates the partner webserver 120 and an entity that operates the pop-under machine 110.

In operation 710, as noted above, the pop-under machine 110 (e.g., via the support module 290) generates the browser-executable code. In particular, the browser executable code may be generated such that, during execution of such code by the browser 400 in presenting at least part of the webpage 300 within the browser window 610 (e.g., a first window), the browser-executable code causes the device 130 to perform various operations within, or in support of, the method 500, the method 700, or both. These various operations include operations discussed in detail below with respect to FIG. 9.

According to some example embodiments, the browser-executable code generated in operation 710 includes the killswitch module 320 (e.g., recapture_killswitch.coffee). The killswitch module 320 may be or include a script that is configured to nullify at least part of the browser-executable code. The killswitch module 320 is includable in the webpage 300, if provided within the browser-executable code. For example, an operator of the partner webserver 120 may temporarily or permanently include killswitch module 320 within the webpage 300 to pause or stop the spawning of the pop-under window 620 (e.g., without requesting or relying upon any action by the pop-under machine 110 or its operator). Accordingly, in situations where the pop-under window 620 is displayed by the device 130, the killswitch module 320 is not present in (e.g., absent from) the webpage 300 during execution of the browser-executable code by the browser 400 of the device 130. Moreover, the device 130 (e.g., as caused by its execution of some or all of the browser executable code) may spawn the pop-under window 620 in operation 730 (e.g., by performing operation 520) in response to a determination that the killswitch module 320 is not present in the webpage 300.

In operation 712, as noted above, the pop-under machine (e.g., by the support module 290) provides the browser-executable code to the partner webserver 120. The browser-executable code may be provided for inclusion in the webpage 300, which may form all or part of the website served by the partner webserver 120. This may cause (e.g., trigger) the partner webserver 120 to perform operations 720 and 722, as discussed above with respect to FIG. 7.

In operation 750, as noted above, the pop-under machine 110 (e.g., via the pop-under content module 220, the switchboard module 350, the support module 260, or any suitable combination thereof) generates the content that was requested by the device 130 in operation 740. The generation of the content may be based on one or more search criteria received from the device 130 (e.g., as part of a request for generation of the content), and the generation of the content may be in response to (e.g., triggered by) a request for generation of the content (e.g., received from the device 130 as a result of the device 130 performing operation 740).

In operation 851, the pop-under machine 110 (e.g., via the pop-under content module 220, the switchboard module 350, the support module 260, or any suitable combination thereof) generates the information that will be linked to the pop-under window 620. For example, in situations where the content generated in operation 750 includes one or more search results that have been obtained based on a search criterion previously submitted via the browser window 610 of the browser 400 (e.g., a search result based on the search criterion but not previously presented in the browser window 610), the information generated in operation 851 may be or include a webpage (e.g., further webpage) that describes the one or more search results in greater detail, enables the reservation or purchase of an item or service described by the one or more search results, or any suitable combination thereof.

In operation 752, as noted above, the pop-under machine 110 (e.g., via the pop-under content module 220, the switchboard module 350, the support module 260, or any suitable combination thereof) provides the content that was generated in operation 750 to the device 130 (e.g., for inclusion within the pop-under window 620 spawned at the device 130). This content may be provided as a response to a request for generation of the content. As discussed above, the browser-executable code within the webpage 300 may cause the device 130 to update the pop-under window 620 with the provided content and display the updated pop-under window 620 with the provided content (e.g., in response to the browser window 610 ceasing to present at least the webpage 300 or any other part of the website hosted by the partner webserver 120).

In operation 792, as noted above, the pop-under machine 110 (e.g., by the support module 260) provides the information generated in operation 851 to the device 130 (e.g., in response to activation of the link within the pop-under window 620 in operation 790). For example, the pop-under machine 110 may provide one or more webpages that describe the one or more search results discussed above with respect to operation 851.

As shown in FIG. 9, at least a portion of the method 700 may form all or part of a set of operations performed by the device 130. As shown in FIG. 9, the device 130 may perform operations 721, 725, 730, 740, 755, 760, and 780 (e.g., as a separate method). According to various example embodiments, the device 130 may additionally perform one or more of operations 790 and 795. Additionally, as shown in FIG. 9, various operations of the method 500 discussed above with respect to FIG. 5 may be integrated with the operations performed by the device 130.

In operation 721, as noted above, the device 130 requests the webpage 300 from the partner webserver 120 (e.g., via the network 190). As shown in FIG. 9, operation 501, in which the user 132 enters the website of the partner webserver 120, may be performed as part (e.g., a precursor task, a subroutine, or a portion) of operation 721.

In operation 725, as noted above, the device 130 loads the webpage 300 received from the partner webserver 120. The device 130 (e.g., via the browser 400) may load and begin executing the browser-executable code received with the webpage 300. As shown in FIG. 9, operation 502, in which the device 130 loads the webpage 300, may be performed as part of operation 725.

In operation 730, as noted above, the device 130 (e.g., via the browser 400) executes some or all of the browser-executable code received with the webpage 300. As shown in FIG. 9, one or more of operations 503, 504, 520, 521, 530, and 540 may be performed as part of operation 730. Accordingly, performance of operation 730 may include determining that a previously spawned pop-under window exists or does not exist (e.g., operation 503), determining that a pop-under window is to be spawned (e.g., operation 504), causing the pop-under window 620 to be spawned at the device 130 (e.g., operation 520), determining that one or more search criteria have been submitted via the browser 400 (e.g., operation 521), and obtaining such search criteria (e.g., operation 540). For example, in some instances the device 130 determines that the browser window 610 is the only previously spawned window of the browser 400, and the device 130 then spawns the pop-under window 620 based on this determination.

As noted above, the spawning of the pop-under window 620 may further be based on one or more rules (e.g., incorporated into the browser-executable code, such as the rules module 330). Any one or more of such rules (e.g., as discussed above with respect to operation 701), may have been received by the pop-under machine 110 from the partner webserver 120 prior to inclusion in the browser-executable code. Furthermore, any one or more such rules may be stored by the pop-under machine 110 (e.g., within the database 115) for readily incorporating such rules into the browser-executable code. In addition, the spawning of the pop-under window 620 (e.g., second window) may result in the pop-under window 620 being initially obscured by the browser window 610 (e.g., first window) of the browser 400. At the time that the pop-under window 620 is initially spawned, the pop-under window 620 may contain or otherwise include default content that was generated with no influence from any search criterion submitted via the browser window 610. In some situations, the default content is no content at all (e.g., blank or null content).

As shown in FIG. 9, operations 510, 511, 512 and 513 may be performed after (e.g., as a result of) operation 730. For example, if performance of operation 504 determines that the pop-under window 620 should not be spawned, the device 130 may go on to terminate execution of the browser-executable code (e.g., disarm all scripts and hide any pre-existing pop-under windows, as discussed above with respect operation 510) and allow the user 132 to exit the website of the partner webserver 120 without displaying any pop-under window to the user 132.

In operation 740, as noted above, the device 130 requests and obtains content for the spawned pop-under window 620 (e.g., from the pop-under machine 110). This may cause (e.g., trigger) the pop-under machine 110 to perform operation 750 and 752, as discussed above with respect to FIGS. 7 and 8.

In operation 755, as noted above, the device 130 updates the pop-under window 620 by incorporating some or all of the content generated by the pop-under machine 110 into the pop-under window 620. As shown in FIG. 9, operation 541, in which the pop-under window 620 is updated using the search information obtained in operation 540, may be performed as part of operation 755. Accordingly, the device 130 (e.g., as caused by its execution of some or all of the browser-executable code), may replace any default content of the pop-under window 620 with the generated content that was provided by the pop-under machine 110. In any case, the updated pop-under window 620 may include a link to information (e.g., a further webpage) that describes some or all of the content incorporated into the pop-under window 620 in operation 755. As noted above, such a link may be a URL for a further webpage that describes a search result that was obtained from one or more search criteria previously presented in the browser window 610 (e.g., first window). As also noted above, such a search result may be an additional search result that has not previously appeared in the browser window 610. In some example embodiments, the further webpage is part of the same website hosted by the partner webserver 120.

As shown in FIG. 9, one or more of operations 542, 543, and 760 may be performed after operation 755. Accordingly, the device 130 (e.g., as caused by its execution of some or all of the browser-executable code) may determine that the user 132 has not only exited the webpage 300, but has also exited the website of the partner webserver 120 (e.g., by closing the browser window 610 of the browser 400, or by navigating to a different website). Hence, prior to determining that the user 132 has exited the website, the user 132 may cause the browser 400 to replace the webpage 300 with a different webpage from the same website served by the partner webserver 120, and at this point, the device 130 may determine that the replacement of the webpage 300 with the different webpage from the same website does not indicate that the browser window 610 (e.g., first window) has ceased to present at least part of that same website.

In operation 780, as noted above, the device 130 displays the pop-under window 620 (e.g., in its updated form as updated in operation 755). According to some example embodiments, the pop-under window 620 (e.g., a second window) is displayed in response to closure of the browser window 610 (e.g., a first window). In alternative example embodiments, the pop-under window 620 is displayed in response to the browser window 600 replacing or being caused to replace at least part of the website of the partner webserver 120 with at least part of a different website. As shown in FIG. 9, operation 544, in which the pop-under window 620 becomes visible to the user 132, may be performed as part of operation 780.

As shown in FIG. 9, operations 790 and 795 may be performed after operation 780. These operations 790 and 795 may be performed by the device 130 (e.g., as caused by its execution of some or all of the browser-executable code) as described above with respect to FIG. 7.

Figure 10:
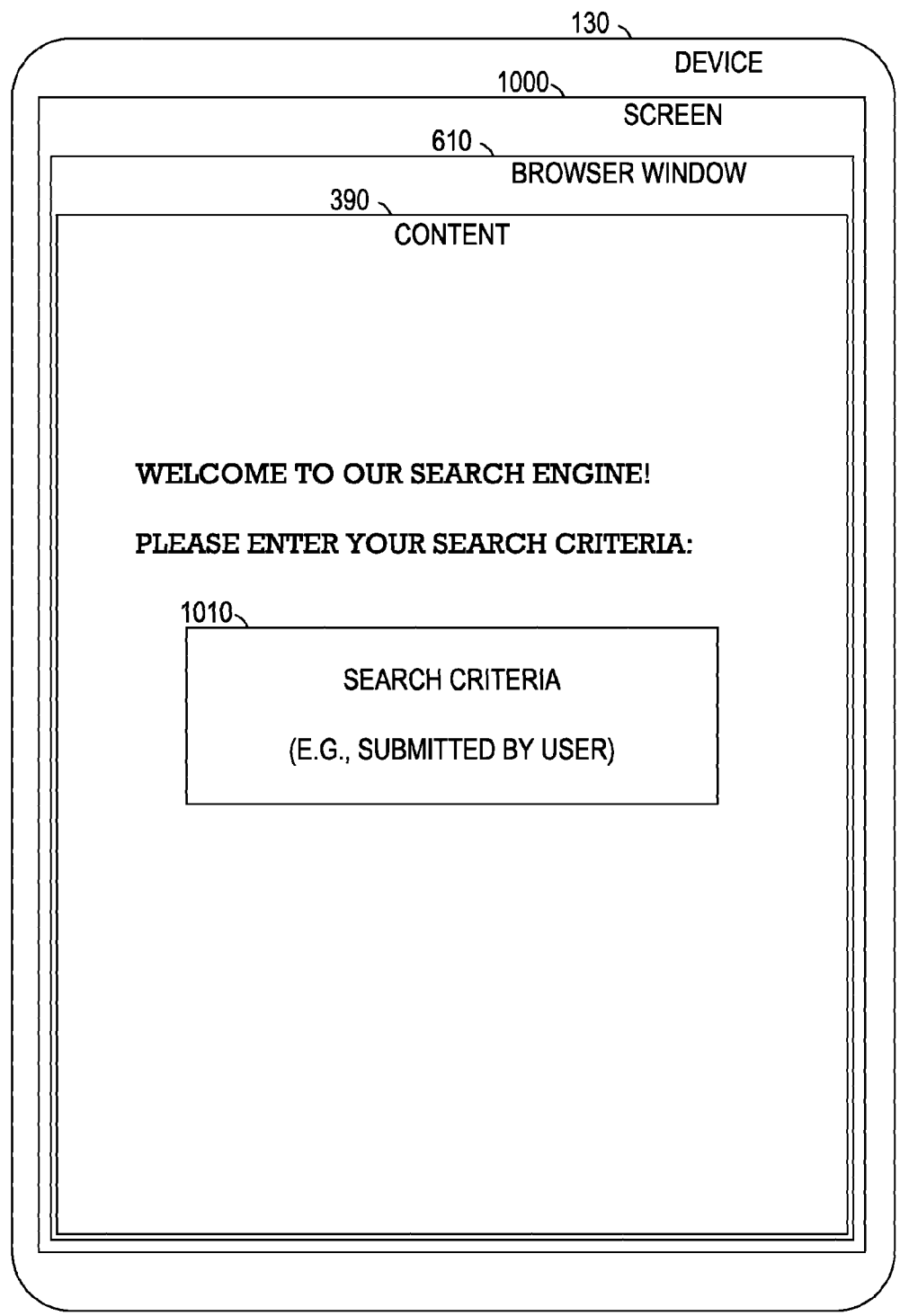
FIGS. 10-12 are face views of the device at various points in the method of presenting the pop-under window, according to some example embodiments.
Figure 11:
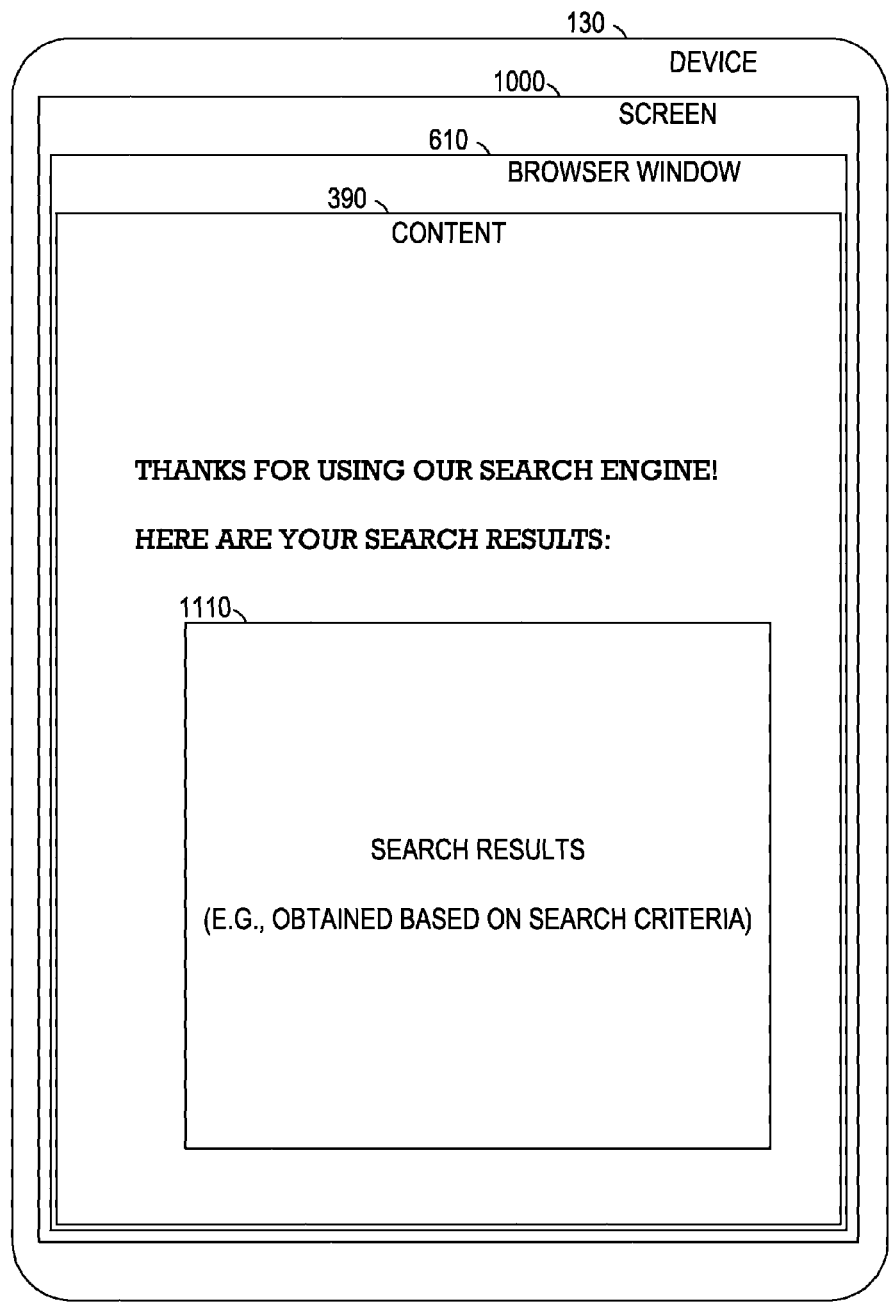
Figure 12:
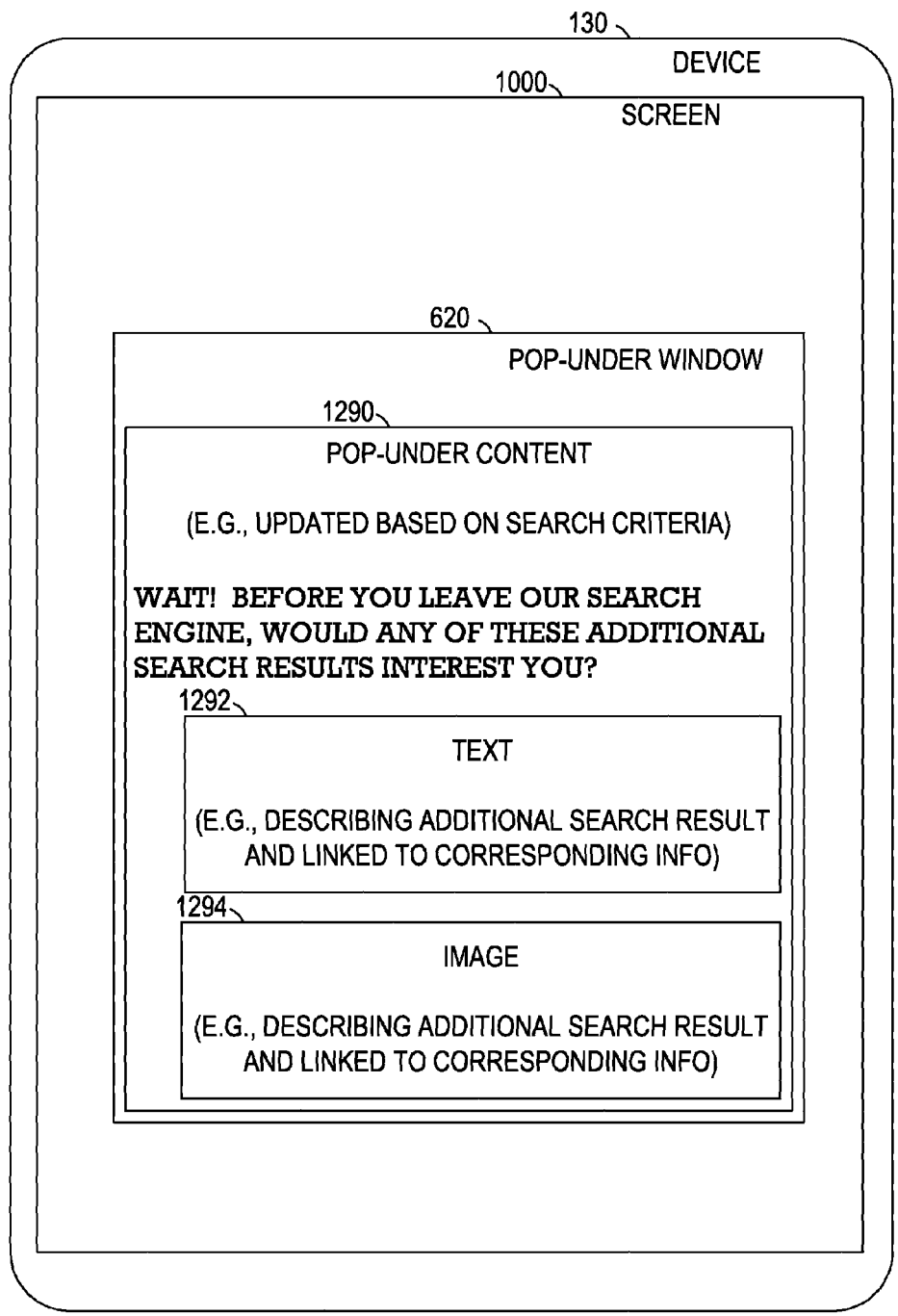

FIGS. 10-12 are face views of the device 130 at various points in the method 700 of presenting the pop-under window 620, according to some example embodiments. As shown in FIG. 10, the device 130 has a screen 1000 (e.g., a display screen or other graphics display). The screen 1000 is displaying the browser window 610 of the browser 400, and the content 390 of the webpage 300 is being displayed in the browser window 610. Among the content 390 is a text field 1010 configured to accept one or more search criteria (e.g., as a submission to be included by the user 132 of the device 130).

As shown in FIG. 11, the screen 1000 of the device 130 continues to present the browser window 610 of the browser 400. The webpage 300 is a dynamically updatable webpage, and the content 390 of the webpage 300 has been updated to present search results 1110. The search results 1110 may be obtained (e.g., from the partner webserver 120, for example, via a search engine included therein) based on the one or more search criteria submitted via the text field 1010 shown in FIG. 10.

As shown in FIG. 12, the browser window 610 (e.g., first window) has been closed, and the browser window 610 has therefore ceased to present any part of the webpage 300. According to the example embodiments shown in FIG. 12, not only has the user 132 left the webpage 300, but the user 132 has also left the entire website of the partner webserver 120. Hence, the screen 1000 of the device 130 no longer shows the browser window 610. By operation of the browser executable code that had previously been included in the webpage 300 and executed by the browser 400 on the device 130, the screen 1000 of the device 130 now presents (e.g., displays) the pop-under window 620 (e.g., in accordance with the method 500, the method 700, or both).

Moreover, as shown in FIG. 12, the pop-under window 620 includes pop-under content 1290, which may be or include content generated by the pop-under machine 110 (e.g., in operation 750) and utilized by the device 130 (e.g., in operation 755). The pop-under content 1290 may be or include text 1292, an image 1294, or any suitable combination thereof. As shown in FIG. 12, the text 1292 may be or include one or more text strings that describe an additional search result (e.g., not previously shown among the search results 1110), and one or more of such text strings may be linked to corresponding information (e.g., a further webpage that describes the additional search result). Similarly, the image 1294 may be or include visual information (e.g., an array of pixels) that depicts or otherwise describes such an additional search result, and such visual information may be linked to corresponding information (e.g., the further webpage that describes the additional search result).

According to various example embodiments, one or more of the methodologies described herein may facilitate presentation of a pop-under window or a pop-up window within a graphical user interface. Moreover, one or more of the methodologies described herein may facilitate recapture of expressed user interest in one or more search criteria, facilitate A/B testing, and provide a convenient killswitch feature to temporarily or permanently disable the presentation of one or more pop-under windows.

When these effects are considered in aggregate, one or more of the methodologies described herein may obviate a need for certain efforts or resources that otherwise would be involved in machine-implemented presentation of a pop-under window or a pop-up window within a graphical user interface. Efforts expended by a user in deciding whether to revisit a previously visited website may be reduced by use of (e.g., reliance upon) a machine that implements one or more of the methodologies described herein (e.g., pop-under machine 110). Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 13:
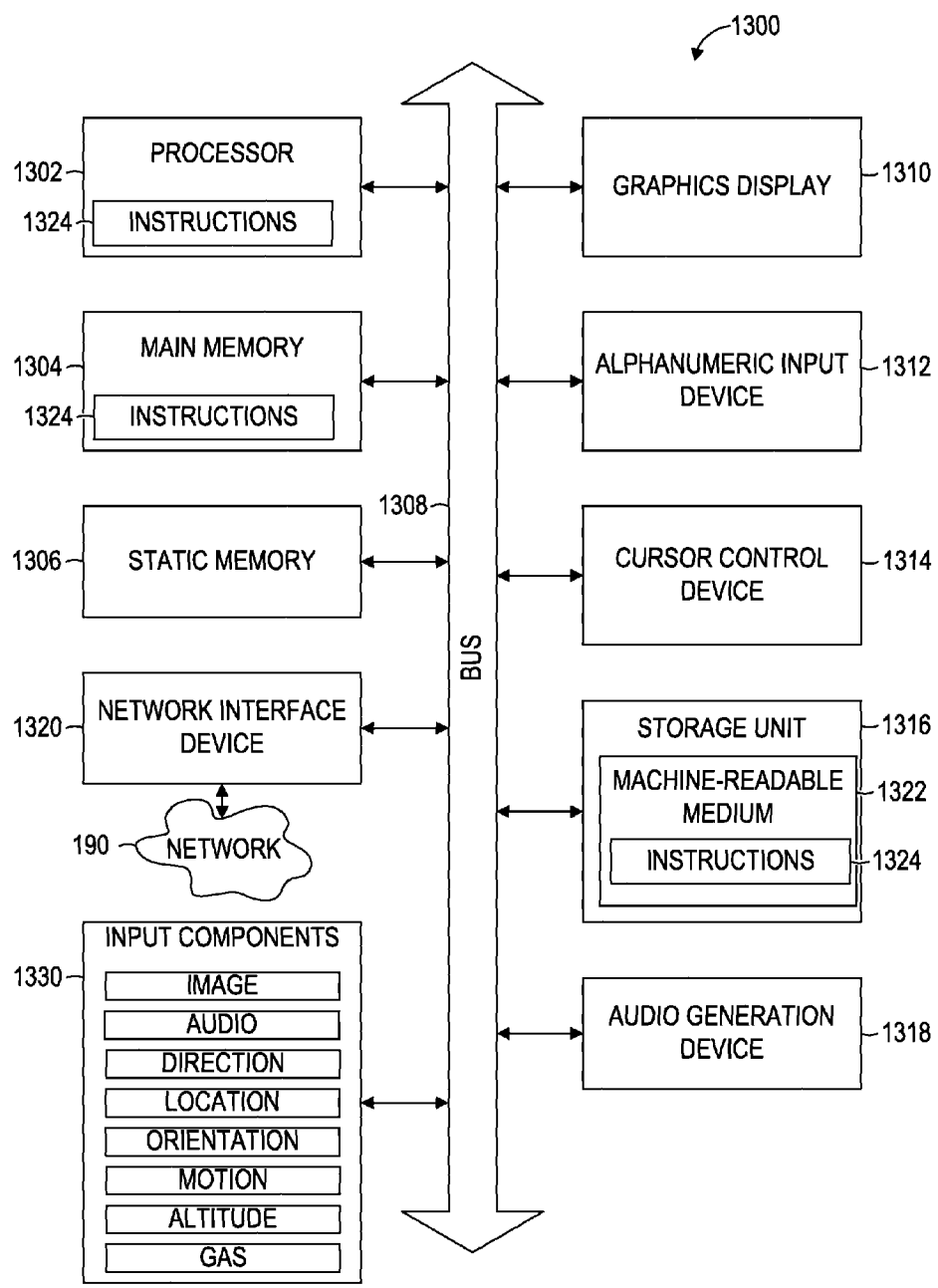
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be communicatively coupled (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein. In some example embodiments, the processor 1302 is a multicore CPU (e.g., a dual-core CPU, a quad-core CPU, or a 128-core CPU) within which each of multiple cores is a separate processor that is able to perform any one or more the methodologies discussed herein, in whole or in part. Although the beneficial effects described herein may be provided by the machine 1300 with at least the processor 1302, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof. In some example embodiments, the instructions 1324 for execution by the machine 1300 may be carried by a carrier medium. Examples of such a carrier medium include a storage medium and a transient medium (e.g., a signal carrying the instructions 1324).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
by operation of a machine comprising one or more processors, generating browser-executable code that, during execution by a browser of a device in presenting at least part of a website within a first window of the browser, causes the device to:
spawn a second window of the browser, the second window being spawned with default content in response to the first window of the browser initiating presentation of at least the part of the website;
obtain a non-default search result based on a search criterion submitted via the first window to the website after the second window has been spawned, the non-default search result being obtained in response to a command to present no part of the website within the first window;
update the previously spawned second window with the obtained non-default search result in response to the command to present no part of the website within the first window; and
display the obtained non-default search result in the previously spawned and updated second window after the first window presents no part of the website in accordance with the command;
by operation of the machine, providing the browser-executable code to a webserver of the website for inclusion in a webpage of the website, the webpage being subsequently provided to the device by the webserver, the browser-executable code being subsequently executed by the browser in presenting the webpage of the website;
by operation of the machine, obtaining the non-default search result based on the search criterion in response to a request from the device for the non-default search result, the non-default search result being obtained in response to the command to present no part of the website within the first window; and
by operation of the machine, providing the obtained non-default search result to the device for inclusion in the previously spawned second window of the browser, the browser-executable code within the webpage causing the device to update the previously spawned second window with the provided non-default search result in response to the command to present no part of the website within the first window and display the previously spawned and updated second window after the first window presents no part of the website.

2. The method of claim 1 further comprising:
causing the updated second window to be become visible on a display of the device in response to closure of the first window.

3. The method of claim 1 further comprising:
causing the updated second window to become visible on a display of the device in response to replacement of at least the part of website by at least part of a different website within the first window.

4. The method of claim 1, wherein:
the generated and provided browser-executable code, during execution by the browser, causes the device to determine that the first window is the only previously spawned window of the browser; and
the second window is spawned based on the first window being the only previously spawned window of the browser.

5. The method of claim 1, wherein:
the generated and provided browser-executable code, during execution by the browser, causes the device to spawn the second window after evaluating a rule received by the machine from the webserver of the website.

6. The method of claim 1, wherein:
the generated and provided browser-executable code, during execution by the browser, causes the device to spawn the second window after evaluating a rule stored by the machine.

7. The method of claim 1, wherein:
the second window, when spawned, is spawned as a pop-under window that is initially obscured by the first window of the browser.

8. The method of claim 1, wherein:
the default content of the spawned second window is generated with no influence from the search criterion submitted by the first window.

9. The method of claim 1, wherein:
the generated and provided browser-executable code, during execution by the browser, causes the device to replace the default content of the second window with the non-default search result provided by the machine.

10. The method of claim 1, wherein the generated and provided browser-executable code, during execution by the browser, causes the device to determine that replacement of the webpage with a different webpage from the same website does not indicate that the first window presents no part of the website.

11. The method of claim 1, further comprising:
by operation of the machine; providing to the webserver a browser-executable killswitch script within the browser-executable code, the browser-executable killswitch script being configured to nullify at least part of the browser-executable code.

12. The method of claim 11, wherein:
the generated and provided browser-executable code, during execution by the browser, causes the device to:
determine that the killswitch script previously provided by the machine to the webserver and configured to nullify at least part of the browser-executable code is not present in the webpage provided to the device by the webserver; and
spawn the second window in response to a determination by the device that the killswitch script is not present in the webpage.

13. The method of claim 1, wherein:
the generated and provided non-default search result in the updated second window is obtained based on the search criterion but not previously presented in the first window; and
the generated and provided non-default search result and the updated second window includes a link to a further webpage that describes the search result.

14. The method of claim 13, wherein:
the further webpage is included in the same website at least part of which was presented in the first window of the browser.

15. The method of claim 1, wherein:
the generating of the browser-executable code is performed by a first arrangement of processors among the processors of the machine; and
the obtaining of the non-default search result is performed by a second arrangement of processors among the processors of the machine.

16. The method of claim 1; wherein:
the generating of the browser-executable code is performed by at least a first processor among the one or more processors of the machine; and
the obtaining of the non-default search result is performed by at least a second processor among the one or more processors of the machine.

17. The method of claim 16, wherein:
at least the first and second processors of the machine are different cores in a multicore central processing unit (CPU).

18. A non-transitory machine-readable storage medium comprising instructions that, when executed by one or more processors of a machine, cause the machine to perform operations comprising:
by operation of the machine comprising the one or more processors, generating browser-executable code that, during execution by a browser of a device in presenting at least part of a website within a first window of the browser, causes the device to:
spawn a second window of the browser, the second window being spawned with default content in response to the first window of the browser initiating presentation of at least the part of the website;
obtain a non-default search result based on a search criterion submitted via the first window to the website after the second window has been spawned, the non-default search result being obtained in response to a command to present no part of the website within the first window in response to the first window initiating presentation of at least the part of the website;
update previously spawned second window with the obtained non-default search result in response to the command to present no part of the website within the first window; and
display the obtained non-default search result in the previously spawned and updated second window after the first window presents no part of the website in accordance with the command;
by operation of the machine, providing the browser-executable code to a webserver of the website for inclusion in a webpage of the website, the webpage being subsequently provided to the device by the webserver, the browser-executable code being subsequently executed by the browser in presenting the webpage of the website;

by operation of the machine, obtaining the non-default search result based on the search criterion in response to a request from the device for the non-default search result, the non-default search result being obtained in response to the command to present no part of the website within the first window; and by operation of the machine, providing the obtained non-default search result to the device for inclusion in the previously spawned second window of the browser, the browser-executable code within the webpage causing the device to update the previously spawned second window with the provided non-default search result in response to the command to present no part of the website within the first window and display the previously spawned and updated second window after the first window presents no part of the website.

19. The non-transitory machine-readable storage medium of claim 18, wherein:

the generating of the browser-executable code is performed by at least a first processor among the one or more processors of the machine; and the obtaining of the non-default search result is performed by at least a second processor among the one or more processors of the machine.

20. A system comprising:

one or more processors;

a browser code module comprising at least one processor among the one or more processors and configured to perform operations comprising:

generating browser-executable code that, during execution by a browser of a device in presenting at least part of a website within a first window of the browser, causes the device to:

spawn a second window of the browser, the second window being spawned with default content in response to the first window of the browser initiating presentation of at least the part of the website, obtain a non-default search result based on a search criterion submitted via the first window to the website after the second window has been spawned, the non-default search result being obtained in response to a command to present no part of the website within the first window in response to the first window initiating presentation of at least the part of the website, update the previously spawned second window with the obtained non-default search result in response to the command to present no part of the website within the first window, and display the obtained non-default search result in the previously spawned and updated second window after the first window presents no part of the website in accordance with the command; and providing the browser-executable code to a webserver of the website for inclusion in a webpage of the website, the webpage being subsequently provided to the device by the webserver, the browser-executable code being subsequently executed by the browser in presenting the webpage of the website; and a window content module comprising at least one processor among the one or more processors and configured to perform operations comprising:

obtaining the non-default search result based on the search criterion in response to a request from the device for the non-default search result, the non-default search result being obtained in response to the command to present no part of the website within the first window; and providing the obtained non-default search result to the device for inclusion in the previously spawned second window of the browser, the browser-executable code within the webpage causing the device to update the previously spawned second window with the provided non-default search result in response to the command to present no part of the website within the first window and display the previously spawned and updated second window after the first window presents no part of the website.

* * * * *

UNITED STATES PATENT AND TRADEMARK OFFICE
CERTIFICATE OF CORRECTION

PATENT NO. : 9,922,131 B2  
APPLICATION NO. : 14/528395  
DATED : March 20, 2018  
INVENTOR(S) : Goldstein et al.

Page 1 of 1

It is certified that error appears in the above-identified patent and that said Letters Patent is hereby corrected as shown below:

In Column 9, Line 24, delete "click through" and insert --clickthrough-- therefor In Column 10, Line 16, delete "AB" and insert --A/B-- therefor In Column 14, Line 64, delete "<script type="text/javascript" src="{recapture portal javascript location}>" and insert --<script type="text/javascript" src="{recapture portal javascript location}">-- therefor In Column 15, Lines 22-23, delete "<script type="text/javascript" src="{recapture portal killswitch location}>" and insert --<script type="text/javascript" src="{recapture portal killswitch location}">-- therefor In Column 18, Line 66, delete "290" and insert --260-- therefor In Column 19, Line 26, delete "290)" and insert --260)-- therefor In Column 19, Line 38, delete "290)" and insert --260)-- therefor In Column 20, Line 4, delete "290)" and insert --260)-- therefor In Column 22, Line 51, delete "600" and insert --610-- therefor In Column 29, Line 58, in Claim 11, delete "machine;" and insert --machine,-- therefor In Column 30, Line 26, in Claim 16, delete "claim 1;" and insert --claim 1,-- therefor Signed and Sealed this  
Eleventh Day of December, 2018

Andrei Iancu  
*Director of the United States Patent and Trademark Office*